(12) United States Patent
Mahmood et al.

(10) Patent No.: US 12,005,578 B2
(45) Date of Patent: Jun. 11, 2024

(54) REAL-TIME REAL-WORLD REINFORCEMENT LEARNING SYSTEMS AND METHODS

(71) Applicant: Ocado Innovation Limited, Hatfield (GB)

(72) Inventors: Ashique Rupam Mahmood, Toronto (CA); Brent J. Komer, Waterloo (CA); Dmytro Korenkevych, Toronto (CA)

(73) Assignee: Ocado Innovations Limited, Hatfield (GB)

( * ) Notice: Subject to any disclaimer, the term of this patent is extended or adjusted under 35 U.S.C. 154(b) by 1257 days.

(21) Appl. No.: 16/560,761

(22) Filed: Sep. 4, 2019

(65) Prior Publication Data

US 2020/0074241 A1 Mar. 5, 2020

Related U.S. Application Data

(60) Provisional application No. 62/726,788, filed on Sep. 4, 2018.

(51) Int. Cl.
*G06N 20/00* (2019.01)
*B25J 9/16* (2006.01)
(Continued)

(52) U.S. Cl.
CPC .............. *B25J 9/163* (2013.01); *B25J 9/161* (2013.01); *G06F 18/2178* (2023.01);
(Continued)

(58) Field of Classification Search
CPC ....... B25J 9/163; B25J 9/161; G06F 18/2178; G06N 20/00; G06N 7/01; G06N 3/006;
(Continued)

(56) References Cited

U.S. PATENT DOCUMENTS

| | | |
|---|---|---|
| 2016/0288323 A1 | 10/2016 | Mühlig et al. |
| 2018/0032864 A1 | 2/2018 | Graepel et al. |

(Continued)

FOREIGN PATENT DOCUMENTS

WO 2018/053187 A1 3/2018

OTHER PUBLICATIONS

Gaskett, C. (2002). Q-learning for robot control. (Year: 2002).*
(Continued)

*Primary Examiner* — Ryan C Vaughn
(74) *Attorney, Agent, or Firm* — Seed Intellectual Property Law Group LLP

(57) ABSTRACT

A reinforcement learning architecture for facilitating reinforcement learning in connection with operation of an external real-time system that includes a plurality of devices operating in a real-world environment. The reinforcement learning architecture includes a plurality of communicators, a task manager, and a reinforcement learning agent that interact with each other to effectuate a policy for achieving a defined objective in the real-world environment. Each of the communicators receives sensory data from a corresponding device and the task manager generates a joint state vector based on the sensory data. The reinforcement learning agent generates, based on the joint state vector, a joint action vector, which the task manager parses into a plurality of actuation commands. The communicators transmit the actuation commands to the plurality of devices in the real-world environment.

25 Claims, 10 Drawing Sheets

(51) Int. Cl.
*G06F 18/21* (2023.01)
*G06V 10/778* (2022.01)
*G06V 10/96* (2022.01)

(52) U.S. Cl.
CPC ......... *G06N 20/00* (2019.01); *G06V 10/7784* (2022.01); *G06V 10/96* (2022.01)

(58) Field of Classification Search
CPC ............... G06V 10/7784; G06V 10/96; G05B 2219/40499
See application file for complete search history.

(56) References Cited

U.S. PATENT DOCUMENTS

2018/0143789 A1* 5/2018 Huntzicker ........... G06F 3/0665
2019/0070735 A1* 3/2019 Tappeiner ............... G10L 17/00

OTHER PUBLICATIONS

Merrick, K. E. (2012). Intrinsic motivation and introspection in reinforcement learning. IEEE Transactions on Autonomous Mental Development, 4(4), 315-329. (Year: 2012).*

Anonymous Author(s), "Benchmarking Reinforcement Learning Algorithms on Real-World Robots," Submitted to the $2^{nd}$ Conference on Robot Learning, 2018, 28 pages.

Mahmood et al., "Setting up a Reinforcement Learning Task with a Real-World Robot," arXiv:submit/2190126 [cs.LG], Mar. 19, 2018, 6 pages.

Mahmood et al., "Sense-Act: A Robot-Data Communication Architecture for RL Tasks," AI for Kindred.ai, Oct. 12, 2017, 5 pages.

* cited by examiner

REAL-TIME REAL-WORLD REINFORCEMENT LEARNING SYSTEMS AND METHODS

BACKGROUND

Technical Field

The present disclosure relates to reinforcement learning environments and, more particularly, to a general reinforcement learning framework for operating devices in a real-world setting.

Description of the Related Art

Reinforcement learning models are an attractive field of study in interactive environments in which an agent is trained to accomplish a goal or maximize a result in connection with a certain process. For instance, using reinforcement learning, an agent can be trained to achieve a higher score in a video game via exchange of states and rewards. Robotics and related devices are under-utilized in the field of reinforcement learning due to issues of reliability and poor learning performance with robots. Some reinforcement learning models have proven to be somewhat effective in computer simulations, which are non-real-world environments that do not involve control of physical robotics and devices. However, when applied to real-world environments in which physical robotics and devices operate in real-time, these simulated reinforcement learning models are ineffective and characterized by poor performance. The deficiencies of reinforcement learning models operating in real-time in physical real-world environments are attributed to a variety of factors, including slow rate of data collection, partial observability, noisy sensors, safety, and frailty of the physical devices involved.

Apart from the foregoing deficiencies, a significant issue reinforcement learning systems encounter is that delays or time offsets between events in the system can inhibit reinforcement learning by an agent. For example, variabilities and time delays associated with receipt of sensorimotor packets by a reinforcement learning system and receipt of action commands by a robotic system external to the reinforcement learning system significantly deteriorate the learning performance of the reinforcement learning system. In real-world reinforcement learning environments, the delay in receipt of various information received by the reinforcement learning agent may disassociate causation between a reward or state and a corresponding action. In short, such delays can add uncertainty as to how actions affect subsequent observations and may also affect the responsiveness of the robotic system to action commands and stimulus. As a result, the performance real-world reinforcement learning systems involving robotics has thus far been inferior to the theoretical performance of reinforcement learning simulations involving simulated response of robotics and devices.

BRIEF SUMMARY

Briefly stated, embodiments disclosed herein are directed to systems and methods for implementing a reinforcement learning architecture that interacts with an external real-world environment having a plurality of physical devices operating therein. The reinforcement learning architecture is configured to control the plurality of devices in connection with performance of a reinforcement learning process to achieve a defined objective. The reinforcement learning architecture includes a set of device communicators, a task manager, and a reinforcement learning agent that operate independently from each other and in separate processes of a computer system. The set of device communicators execute on a set of first processors of the computer system and are configured to obtain state data that indicates states of the plurality of devices operating in the real-world environment. Each device communicator of the set of device communicators may be associated with a single device of the plurality of devices. The set of device communicators store the state data in a set of first buffers each associated with a corresponding device communicator of the set of device communicators.

The task manager executes on a second processor of the computer system, obtains the state data stored in the set of first buffers, and stores the joint state vector in a second buffer. The task manager processes the state data and generates a joint state vector based on the state data. In some embodiments, the joint state vector may be generated based on the defined objective to be achieved in the real-world environment. The reinforcement learning agent transitions from a suspended state to an active state and, in the active state, obtains the joint state vector from the second buffer. The reinforcement learning agent generates, based on the joint state vector, a joint action vector indicating actions to be performed by the plurality of devices. The joint action vector may be generated by applying a reinforcement learning policy to information of the joint state vector.

The reinforcement learning agent stores the joint action vector in a third buffer and then transitions back to the suspended state for a defined period of time. The task manager obtains the joint action vector and parses the joint action vector into a plurality of actuation commands respectively corresponding to actions to be performed by the plurality of devices operating in the real-world environment. The task manager stores each of the plurality of actuation commands in a corresponding buffer of a plurality of fourth buffers. Each device communicator of the set of device communicators obtain an actuation command from a buffer of the plurality of fourth buffers that is associated with the device communicator. The set of device communicators cause the actuation commands to be transmitted to corresponding devices of the plurality of devices over a network.

DETAILED DESCRIPTION

Figure 1:
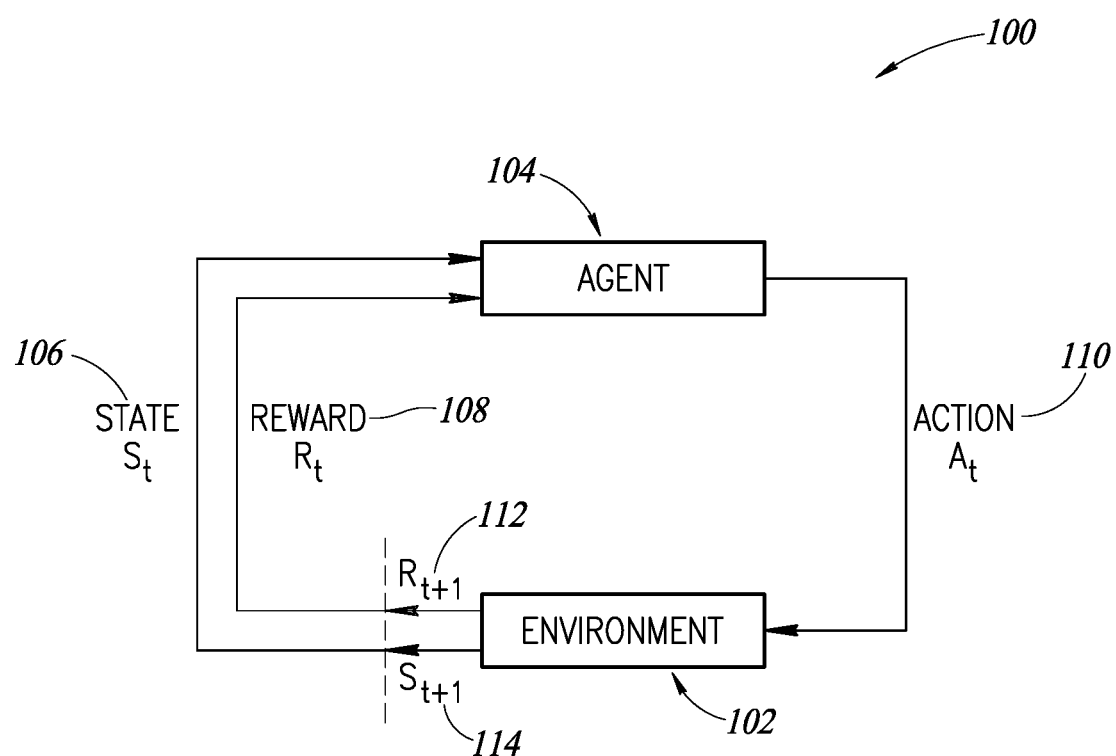
FIG. 1 shows a diagram of a reinforcement learning model.

FIG. 1 shows a diagram of a reinforcement learning process 100 according to one or more embodiments. The reinforcement learning process 100 is a model for reinforcement machine learning in which a reinforcement learning agent 104 learns via interaction with an environment 102. In particular, the reinforcement learning agent 104 determines a state 106 representing a state of the environment 102 at a time t and determines a reward 108 associated with the last transition or change that the agent 104 caused in the environment 102. The state 106 may represent characteristics of the environment 102, such as a position, operating state, speed, direction, or orientation of an entity or object in the environment 102. The reward 108 represents whether the last transition or change in the environment 102 was successful with respect to a defined goal. The reward 108 may further represent a degree to which the transition or change was successful or unsuccessful. The state 106 and the reward 108 may each comprise a set of scalar values each representative of an aspect of the environment 102.

The agent 104 adapts a reinforcement learning model for behavior by interacting with the environment 102 in discrete time steps to maximize the cumulative reward received by the agent 104 in association with performing actions in connection with the environment 102. The agent 104 processes the state 106 and reward 108 received for the time t and determines an action 110 to be performed based on the state 106 and the reward 108. The agent 104 then performs or causes performance of the action 110 involving the environment 102, such as by controlling a device operating in a physical space to perform a defined operation. Thereafter, an entity operating in the environment 102 determines a reward 112 and a state 114 for a time t+1 resulting from the action 110. The agent 104 adapts its reinforcement learning model in response to success or failure indicated by the reward 112 and the new state 114 of the environment 102 and/or agent 104. According to the reinforcement learning process 100, the behavior of the agent 104 can be adapted by trial and error/success to optimize reward received, which may be associated with a goal to be achieved.

In the context of robotics or operation of a collection of devices in real-time and in a physical real-world environment, developing the reinforcement learning model of the reinforcement learning agent 104 has proven to be a difficult challenge. For instance, controlling robotic devices operating in a real-work environment is difficult due to the variability of time associated with steps in the process. Time delays between a reinforcement learning agent decision and sensor readings obtained may vary between the devices associated with the sensors. Processing sensory and state data may take different amounts of time for different devices in the real-world system and, as a result, the accuracy of the decision made by the reinforcement learning agent may not reflect the actual state of the real-world system. Another issue is that the reinforcement learning agent may sequentially obtain sensory data from devices operating in the real-world environment and sequentially process the sensory data to determine the actions to be performed, which can lead to disconnect between the observed state of the real-world environment and the actual state of the real-world environment. For example, a reinforcement learning agent may cause a first device to perform a first action in response to a state observed for the first device at a first time, and then cause a second device to perform a second action in response to a state observed for the second device at a second time. However, a problem may arise in which the first action changes the state of the second device, so the second action performed may not have the desired or intended effect. Worse yet, the reinforcement learning agent may receive feedback indicating that the second action was undesirable and change its policy in response when, in actuality, the second action may have been effective if performed by the second device in connection with the first action.

The present disclosure provides an operational framework in which learning and performance characteristics of real-world reinforcement learning tasks performed by the reinforcement learning agent 104 are similar to or approach the learning characteristics and performance of a simulated reinforcement learning algorithm. The technologies disclosed herein provide numerous benefits to a reinforcement learning system operating to achieve a defined objective in a real-world real-time external system via control of a plurality of devices. One feature of the reinforcement learning system disclosed herein is that time delays between sensory readings and actions initiated by a reinforcement learning agent are reduced by collecting and generating joint vectors based on a plurality of data instances. The time delay is also reduced by causing the reinforcement learning agent to operate in a suspended state for a defined period of time before transitioning to an active state in which a policy is applied. The reinforcement learning system of the present disclosure also improves consistency of time intervals between times at which the reinforcement learning agent makes decisions regarding the actions to be performed by the devices operating in the real-time environment. A further feature of the present disclosure is to provide a framework that is adaptable to operate different types and different configurations of devices to facilitate reinforcement learning. For instance, the framework provided herein is adaptable to add new types of devices or change the current configuration of devices operating in a real-world environment to achieve a desired objective according to a reinforcement learning process.

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks and the environment, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

References to the term "set" (e.g., "a set of items"), as used herein, unless otherwise noted or contradicted by context, is to be construed as a nonempty collection comprising one or more members or instances.

References to the term "subset" (e.g., "a subset of the set of items"), as used herein, unless otherwise noted or contradicted by context, is to be construed as a nonempty collection comprising one or more members or instances of a set or plurality of members or instances.

Figure 2:
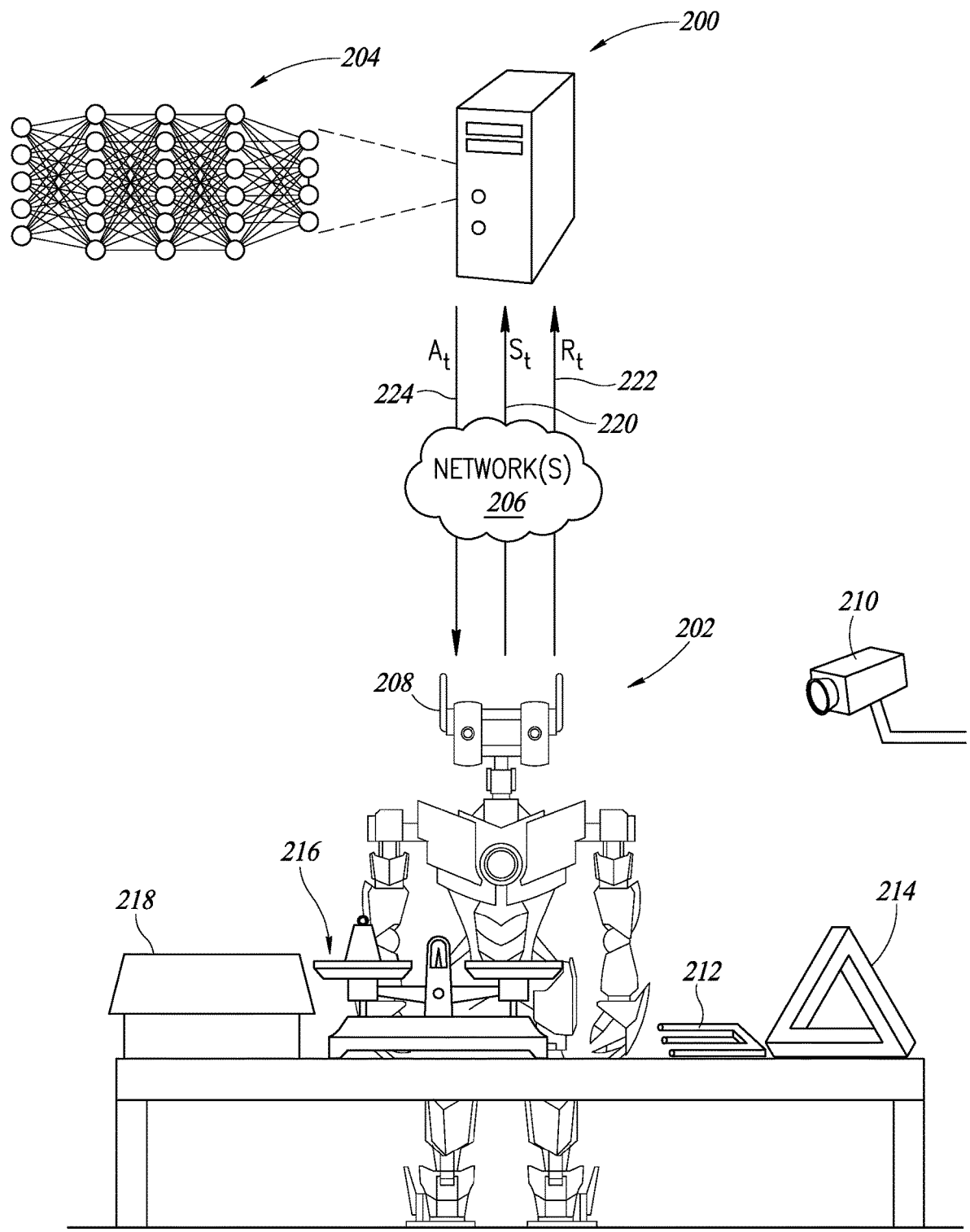
FIG. 2 shows an environment and a computer system that implements a reinforcement learning architecture to facilitate reinforcement learning in connection with operation of devices in the environment according to one or more embodiments.

FIG. 2 shows a diagram in which a computer system 200 communicates in real-time with external devices operating in an environment 202. The computer system 200 includes one or more processors and memory storing a set of instructions that, as a result of execution by the one or more processors, cause the computer system 200 to perform operations described herein. The set of instructions, as result of execution by the one or more processors, cause the computer system 200 to invoke and run a reinforcement learning agent of a reinforcement learning system, as described with respect to FIG. 1 and elsewhere herein. The computer system 200, in particular, operates at least in part according to a reinforcement learning architecture 204 that includes one or more policies π defining behavior of the computer system 200 with respect to the environment 202. The one or more policies π of the reinforcement learning architecture 204 dictate actions to be performed based on a state and/or a reward observed in connection with operation of the devices in the environment 202 and which may correspond to associations or rules regarding relationships between stimulus (state, reward) and response (action). The reinforcement learning architecture 204 may include value functions for determining a long-term value return of a current state under a particular policy π. The reinforcement learning architecture 204 may include a model that is representative of the environment 202.

The computer system 200 is separate from the devices in the environment 202 such that the computer system 200 is not included as a component of any of the devices in the environment 202. The computer system 200 communicates with devices in the environment 202 over one or more communication networks 206. The one or more networks 206 may include wired and/or wireless networks for facilitating communications between the computer system 200 and devices in the environment 202. The one or more networks 206 may include service provider networks providing communication interconnectivity among a plurality of entities in one or more regions, public networks (e.g., the internet, the world wide web), private networks, wide area networks, local area networks, satellite networks, mesh networks, intermediate networks connecting separate networks, local area networks, satellite networks, and/or combinations thereof, by way of non-limiting example. As one particular non-limiting example, the one or more networks may be a local area network to which the computer system 200 and devices in the environment 202, and over which the computer system 200 and the devices may communicate via wired or wireless connections. Although not shown, the environment 202 may include a router for directing wireless communications between the computer system 200 and the devices in the environment 202. Communications between a device in the environment 202 and the computer system 200 may have a time delay that may contribute to the aforementioned difficulties associated with reinforcement learning in real-time and in a real-world setting.

In some embodiments, the computer system 200 may be implemented as a cloud-computing distributed environment in which different processes are executed on separate devices, computers, or servers distributed among two or more networks or locations that are remotely located to the environment 202. For instance, a first process of the reinforcement learning architecture 204 may be executed on a first computer located at a first geographical location and a second process of the reinforcement learning architecture 204 may be executed on a second computer located at a second geographical location. The first computer and the second computer may be different computers in the same facility, or may be computers that are geographically distributed from each other.

Examples of devices in the environment 202 include a robot 208 for performing tasks in the physical space of the environment 202 and a sensor 210 for detecting conditions in the physical space of the environment 202. The robot 208 includes a set of controllable devices (e.g., robotic arm, imaging sensors, robotic grippers, locomotion devices, actuators), one or more controllers configured to control the set of controllable devices, a communication interface including one or more communication devices (e.g., Wi-Fi communication adapter, Zigbee communication adapter, Bluetooth communication adapters, wired network adapter, universal serial bus port), a body, one or more processors, and memory storing instructions for controlling operation of the robot 208. The robot 208 may receive, from the computer system 200 via the communication device, instructions that, as a result of execution, cause the robot 208 to interact in and with environment 202. For example, the robot 208 could receive executable instructions that cause the robot 208 to pick-up one or more items 212 and 214 and place the items 212 and 214 on a scale 216 and then in box 218. Devices of the robot 208 may include a sensor that detects a state of the device, such as a position, orientation, speed, or acceleration of the device.

The sensor 210 shown in the environment 202 is a camera that captures images or video of the environment 202. The sensor 210 includes a communication interface (e.g., wireless network adapter, video output port) via which the sensor 210 transmits the images or video captured to the computer system 200 over the network 206. The sensor 210 may receive communication signals from the computer system 200 over the network 206 that cause the sensor 210 to perform various operations. The sensor 210 may receive instructions that cause the sensor 210 to adjust its operating mode, such as by adjusting settings (e.g., focus, frame rate, resolution). The sensor 210 may have various devices associated therewith that can be controlled responsive to communications from the computer system 200—for example, a set of motors may be attached to the sensor 210 for selectively adjusting an orientation of the sensor 210 and a light source coupled to the sensor 210 may be selectively operable to illuminate areas in the environment 202. Non-limiting examples of other sensors that may be included in the environment 202 include time-of-flight sensors, temperature sensors, microphones, laser range finder (e.g., Lidar), radar, speed sensors, force sensors (e.g., scale), pressure sensors, gyroscopes, electromagnetics sensors (e.g., Hall effect sensor), strain gauges, and proximity sensors.

The environment 202 may include devices other than the robot 208, which are controllable by the computer system 200 and which may provide information to the computer system 200 regarding the state of the device at a given time. Such devices include robotic arms, motors, conveyor belts and/or wheels, hoppers, actuators, sorting devices, switches, valves, and the like.

For a time t in the environment 202, signals may be transmitted over the network 206 indicating a state 220 associated with one or more robots 208 or devices operating in the environment 202, or detected by one or more sensors 210 that observe the environment 202. Each of the devices 208 operating in the environment 200 may provide an observation that partially describes the state 220 of the environment 200. Signals may also be transmitted indicating a set of rewards 222 associated with one or more robots 208, sensors 210, and devices in the environment 202 for the time t. The state 220 is sensory information indicating the state of the corresponding device in the environment 202. For a robotic arm, the state 220 may indicate information regarding position, orientation, movement, etc., of the arm. For the sensor 210, the state 220 may be a measurement for the time t, such as an image captured of the environment 202 at the time t. The reward 222 is an alphanumeric scalar value corresponding to the last action or transition experienced by the robots 208, sensors 210, and the devices in the environment 202. The reward 222, in at least some embodiments, is calculated or determined by a process executing on the computer system 200, such as a process of the reinforcement learning architecture 204. The reward 222 may indicate, at least in part, a desirability of a current state of the corresponding device, sensor, robot, etc., in the environment 202 relative to a defined objective. For a state of the robot 208 that desirable, for example, the reward 222 may be a positive integer having a value proportional to a degree of desirability of the state of the robot 208 relative to one or more goals. By contrast, the reward 222 may be a negative integer having a value proportional to a degree of undesirability of the state of the robot relative to the one or more goals.

The computer system 200 processes the set of state(s) 220 for the time t and generates a set of actions 224 to be performed by the robot 208, the sensor 210, and/or the devices in the environment 202. The set of actions 224 are transmitted over the network 206 to the corresponding robots 208, sensors 210, and devices that are to perform the actions. The set of actions 224 may be selected from a defined plurality of actions specified in memory of the computer system 200. For a robotic arm, an action of the set of actions 224 may cause a gripper of the robotic arm to move to a particular position and orientation. The computer system 200 processes the set of reward(s) 222 in connection with a reinforcement learning process. Other actions may include movement of gears to move the robot to a certain location in the environment 202. Each of the actions 224 may include parameters that specify a target device, robot, or sensor; the action to be performed; and parameters indicating characteristics of the action (e.g., position, speed, direction).

Figure 3:
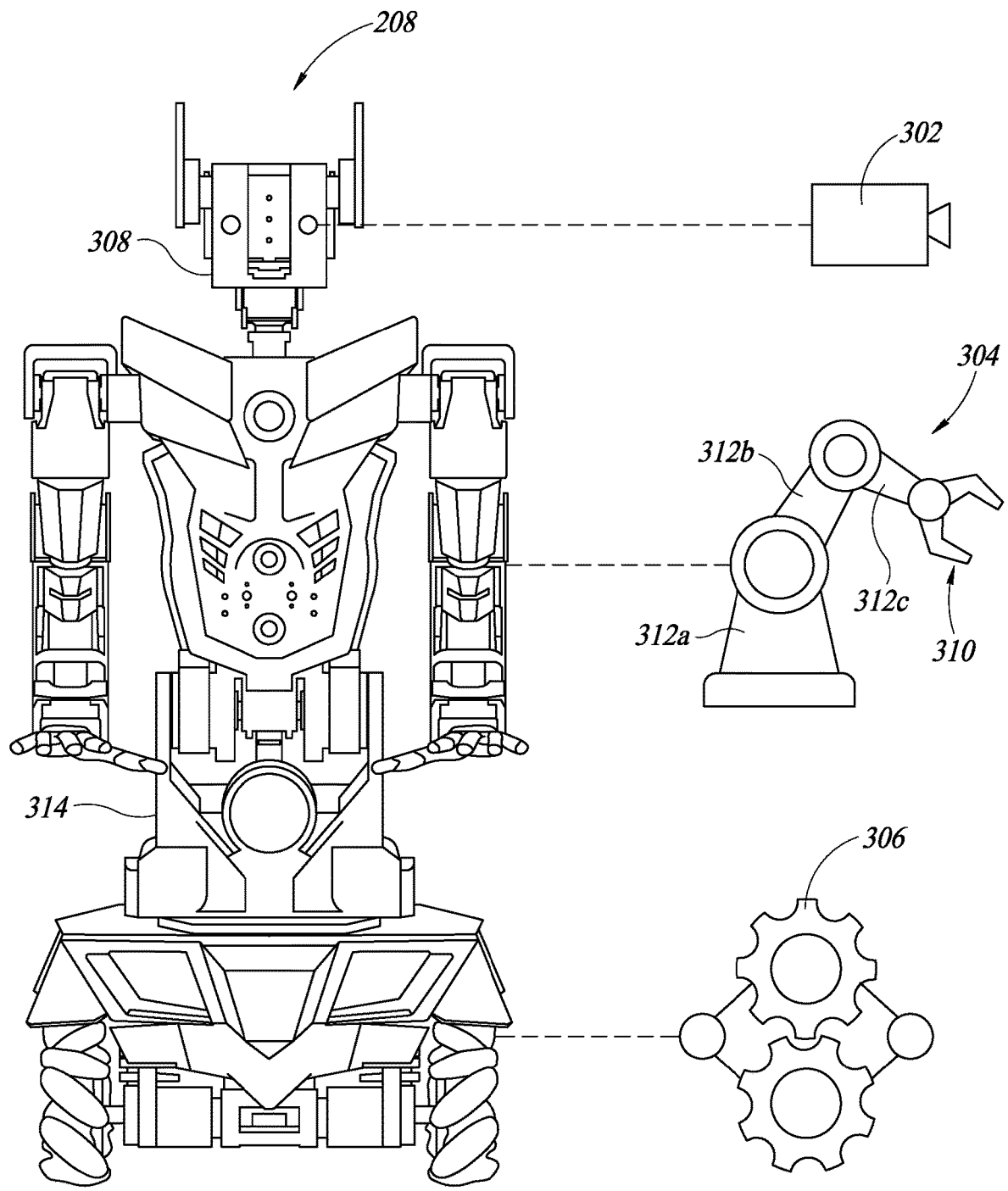
FIG. 3 shows a front view of a robot that operates in the environment of FIG. 2.

FIG. 3 shows a view of the robot 208 in the environment 202 according to one or more embodiments. The robot 208 comprises a variety of devices that each perform one or more functions or operations. The robot 208 shown, for instance, includes a camera 302 that captures images of the environment 202, a pair of robotic arms 304 for interacting with objects and features in the environment 202, and a set of motors 306 for providing motive power to move and orient the robot 208 within the environment 202.

Each of the devices may be configured to provide sensory information regarding a state of the respective device and/or regarding the environment 202. The camera 302 may provide sensory information in the form of images depicting a state of the environment 202 from the perspective of the robot 208. The robotic arm 304 may include a gripping portion 310 and a plurality of segments 312a through 312c that independently move to position and orient the gripping portion 310. Each of the segments 312a through 312c and the gripping portion 310 include servomotors that provide sensory information regarding a position, orientation, state, etc., associated with the corresponding portions. The gripping portion 310 may include sensors (e.g., capacitive, strain gauge, resistive) configured to provide sensory information indicating whether the gripping portion 310 is gripping an object or feature and a pressure applied to the object or feature. The robotic arm 304 may include other sensors that provide sensory information regarding the object or feature. The set of motors 306 may be stepper motors or servomotors that provide sensory information regarding a rotational or linear position of each respective motor.

Each of the devices may be configured to receive actuation information for controlling operation of the respective device. The camera 302, for example, may receive actuation information for adjusting settings thereof. The camera 302 may also have associated therewith one or more motors that receive actuation information that controls a position and/or an orientation of the camera 302, such as by adjusting a rotational position of a head 308 of the robot 208. The robotic arm 304 receives actuation information that controls the segments 312a through 312c and operation of the gripper portion 310. The set of motors 306 receive actuation information that causes application of motive force to move or orient a body 314 of the robot 208 in the environment 202.

In a real-world setting in which the robot 208 operates in real-time and communicates with the computer system 200 over the network 206, each of the motors have different operational characteristics. As one exemplary configuration of the robot 208, the camera 302 streams images at a rate of 20 Hertz (Hz), a motor of the robotic arm streams sensory information packets at 100 Hz and is actuated at a rate of 100 Hz, and a motor of the set of motors 306 is actuated at a rate of 500 Hz and streams sensory information packets at a rate of 60 Hz. Previously, it was difficult to implement an architecture in which the reinforcement learning agent of the computer system 200 could receive the sensory information from the robot 208 and control the motors at a particular timescale due to the differences in performance characteristics between the devices. The reinforcement learning architecture 204 provides a uniform interface and framework in which multiple processes operate independently and in parallel to perform data processing, task-specific computation, and agent-specific computation, as described in further detail herein.

Figure 4:
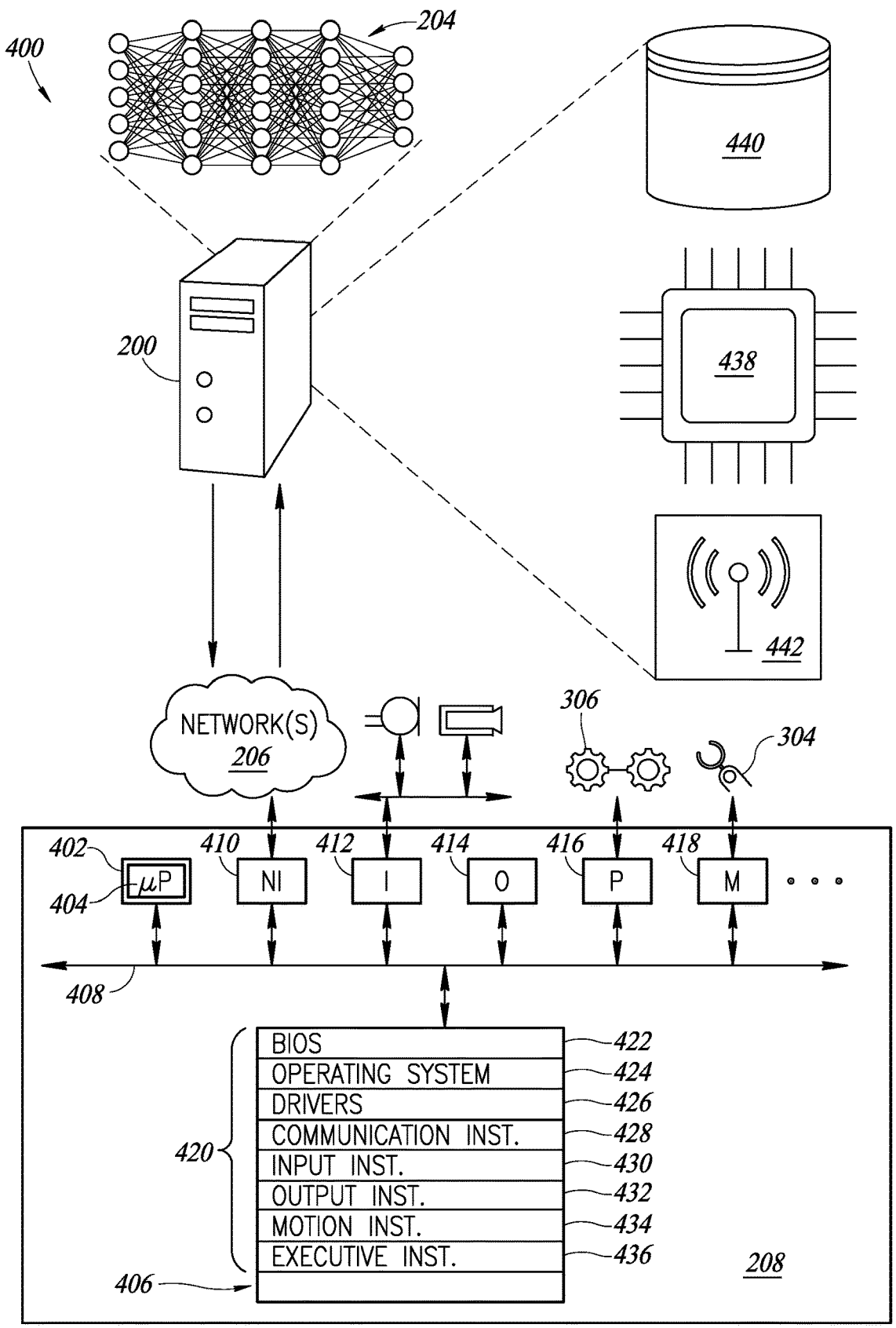
FIG. 4 shows a schematic diagram of the robot of FIG. 3 and the computer system of FIG. 2.

FIG. 4 shows a schematic diagram 400 of the computer system 200 and devices operating in the environment 202 according to one or more embodiments. As discussed herein, robots may take any of a wide variety of forms. FIG. 3 schematically shows parts of robot 208. Robot 208 includes at least one body, and a control subsystem 402 that includes at least one processor 404, at least one non-transitory tangible computer- and processor-readable data storage 406, and at least one bus 408 to which the at least one processor 404 and the at least one non-transitory tangible computer- or processor-readable data storage 406 are communicatively coupled.

The at least one processor 404 may be any logic processing unit, such as one or more microprocessors, central processing units (CPUs), digital signal processors (DSPs), graphics processing units (GPUs), application-specific integrated circuits (ASICs), programmable gate arrays (PGAs), programmed logic units (PLUs), and the like. At least one processor 404 may be referred to herein by the singular, but may be two or more processors.

Robot 208 may include a communications subsystem 410 communicatively coupled to (e.g., in communication with) the bus(es) 408 and provides bi-directional communication with other systems (e.g., systems external to the robot 208) via a network or non-network communication channel, such as the network(s) 206 described herein. The communications subsystem 410 may include one or more buffers. The communications subsystem 410 receives and sends data for the robot 208, such as sensory information and actuation information.

The communications subsystem 410 may be any circuitry effecting bidirectional communication of processor-readable data, and processor-executable instructions, for instance radios (e.g., radio or microwave frequency transmitters, receivers, transceivers), communications ports and/or associated controllers. Suitable communication protocols include FTP, HTTP, Web Services, SOAP with XML, WI-FI compliant, BLUETOOTH compliant, cellular (e.g., GSM, CDMA), and the like.

Robot 208 includes an input subsystem 412. In any of the implementations, the input subsystem 412 can include one or more sensors that measure conditions or states of robot 208, and/or conditions in the environment in which the robot 208 operates. Such sensors include cameras or other imaging devices (e.g., responsive in visible and/or nonvisible ranges of the electromagnetic spectrum including for instance infrared and ultraviolet), radars, sonars, touch sensors, pressure sensors, load cells, microphones, meteorological sensors, chemical sensors, or the like. Such sensors include internal sensors, pressure sensors, load cells, strain gauges, vibration sensors, microphones, ammeter, voltmeter, or the like. In some implementations, the input subsystem 412 includes receivers to receive position and/or orientation information. For example, a global position system (GPS) receiver to receive GPS data, two more time signals for the control subsystem 402 to create a position measurement based on data in the signals, such as, time of flight, signal strength, or other data to effect (e.g., make) a position measurement. Also for example, one or more accelerometers can provide inertial or directional data in one, two, or three axes. In some implementations, the input subsystem 412 includes receivers to receive information that represents posture. For example, one or more accelerometers or one or more inertial measurement units can provide inertial or directional data in one, two, or three axes to the control subsystem 402 to create a position and orientation measurements. The control subsystem 402 may receive joint angle data from the input subsystem 412 or the manipulation subsystem described herein.

Robot 208 includes an output subsystem 414 comprising output devices, such as, speakers, lights, and displays. The input subsystem 412 and output subsystem 414, are communicatively coupled to the processor(s) 404 via the bus(es) 408.

Robot 208 includes a propulsion or motion subsystem 416 comprising motors, actuators, drivetrain, wheels, tracks, treads, and the like to propel or move the robot 208 within a physical space and interact with it. The propulsion or motion subsystem 416 comprises of one or more motors, solenoids or other actuators, and associated hardware (e.g., drivetrain, wheel(s), treads), to propel robot 208 in a physical space. For example, the propulsion or motion subsystem 416 may include a drive train and wheels, or may include legs independently operable via electric motors. Propulsion or motion subsystem 416 may move the body 314 of the robot 208 within the environment 202 as a result of motive force applied by the set of motors 306.

Robot 208 includes a manipulation subsystem 418, for example comprising one or more arms, end-effectors, associated motors, solenoids, other actuators, gears, linkages, drive-belts, and the like coupled and operable to cause the arm(s) and/or end-effector(s) to move within a range of motions. For example, the manipulation subsystem 418 causes actuation of the robotic arm 304 or other device for interacting with objects or features in the environment 202. The manipulation subsystem 418 is communicatively coupled to the processor(s) 404 via the bus(es) 408, which communications can be bi-directional or uni-directional.

Components in robot 208 may be varied, combined, split, omitted, or the like. For example, robot 208 could include a pair of cameras (e.g., stereo pair) or a plurality of microphones. Robot 208 may include one, two, or three robotic arms or manipulators associated with the manipulation subsystem 418. In some implementations, the bus(es) 408 include a plurality of different types of buses (e.g., data buses, instruction buses, power buses) included in the at least one body 314. For example, robot 208 may include a modular computing architecture where computational resources devices are distributed over the components of robot 208. In some implementations, a robot (e.g., robot 208), could have a processor in a left arm and data storage in its thorax. In some implementations, computational resources are located in the interstitial spaces between structural or mechanical components of the robot 208. A data storage device could be in a leg and a separate data storage device in another limb or appendage. In some implementations, the computational resources distributed over the body include redundant computational resources.

The at least one data storage 406 includes at least one non-transitory or tangible storage device. The at least one data storage 406 can include two or more distinct non-transitory storage devices. The data storage 406 can, for example, include one or more a volatile storage devices, for instance random access memory (RAM), and/or one or more non-volatile storage devices, for instance read only memory (ROM), Flash memory, magnetic hard disk (HDD), optical disk, solid state disk (SSD), and the like. A person of skill in the art will appreciate storage may be implemented in a variety of non-transitory structures, for instance a read only memory (ROM), random access memory (RAM), a hard disk drive (HDD), a network drive, flash memory, digital versatile disk (DVD), any other forms of computer- and processor-readable memory or storage medium, and/or a combination thereof. Storage can be read only or read-write as needed. Further, volatile storage and non-volatile storage may be conflated, for example, caching, using solid-state devices as hard drives, in-memory data processing, and the like.

The at least one data storage 406 includes or stores processor-executable instructions and/or processor-readable data 420 associated with the operation of robot 208 or other devices. Here, processor-executable instructions and/or processor-readable data may be abbreviated to processor-executable instructions and/or data.

The execution of the processor-executable instructions and/or data 420 cause the at least one processor 404 to carry out various methods and actions, for example via the motion subsystem 416 or the manipulation subsystem 418. The processor(s) 404 and/or control subsystem 402 can cause robot 208 to carry out various methods and actions including receiving, transforming, and presenting information; moving in the environment 202; manipulating items; and acquiring data from sensors. Processor-executable instructions and/or data 420 can, for example, include a basic input/output system (BIOS) 422, an operating system 424, drivers 426, communication instructions and data 428, input instructions and data 430, output instructions and data 432, motion instructions and data 434, and executive instructions and data 436.

Exemplary operating systems 424 include ANDROID™, LINUX®, and WINDOWS®. The drivers 426 include processor-executable instructions and/or data that allow control subsystem 402 to control circuitry of robot 208. The processor-executable communication instructions and/or data 428 include processor-executable instructions and data to implement communications between robot 208 and an operator interface, terminal, a computer, or the like. The processor-executable input instructions and/or data 430 guide robot 208 to process input from sensors in input subsystem 412. The processor-executable input instructions and/or data 430 implement, in part, the methods described herein. The processor-executable output instructions and/or data 432 guide robot 208 to provide information that represents, or produce control signal that transforms, information for display. The processor-executable motion instructions and/or data 434, when executed, cause the robot 208 to move in a physical space and/or manipulate one or more items. The processor-executable motion instructions and/or data 434, when executed, may guide the robot 208 in moving within its environment via components in propulsion or motion subsystem 416 and/or manipulation subsystem 418. The processor-executable executive instructions and/or data 436, when executed, guide the robot 208 the instant application or task for devices and sensors in the environment 202. The processor-executable executive instructions and/or data 436, when executed, guide the robot 208 in reasoning, problem solving, planning tasks, performing tasks, and the like.

The computer system 200 includes one or more processors 438, memory 440, and a communication interface 442. The memory 440 is computer-readable non-transitory data storage that stores a set of computer program instructions that the one or more processors 438 may execute to implement one or more embodiments of the present disclosure. The memory 440 generally includes RAM, ROM and/or other persistent or non-transitory computer-readable storage media, such as magnetic hard drives, solid state drives, optical drives, and the like. The memory 440 may store an operating system comprising computer program instructions useable by the one or more processors 438 in the general administration and operation of the computer system 200. The memory 440 also stores instructions that, as a result of execution, cause the one or more processors 438 to implement the reinforcement learning architecture 204 described herein.

The communication interface 442 includes one or more communication devices for transmitting communications and receiving communications via the network 206. The one or more communication devices of the communication interface may include wired communication devices and/or wireless communication devices. Non-limiting examples of wireless communication devices include radio frequency communication adapters (e.g., Zigbee adapters, Bluetooth adapters, Wi-Fi adapters) using corresponding communication protocols, satellite communication transceivers, free-space optical communication devices, cellular network transceivers, and the like. Non-limiting examples of wired communication devices include serial communication interfaces (e.g., RS-232, Universal Serial Bus, IEEE 139), parallel communication interfaces, Ethernet interfaces, coaxial interfaces, optical fiber interfaces, and power-line communication interfaces.

Figure 5:
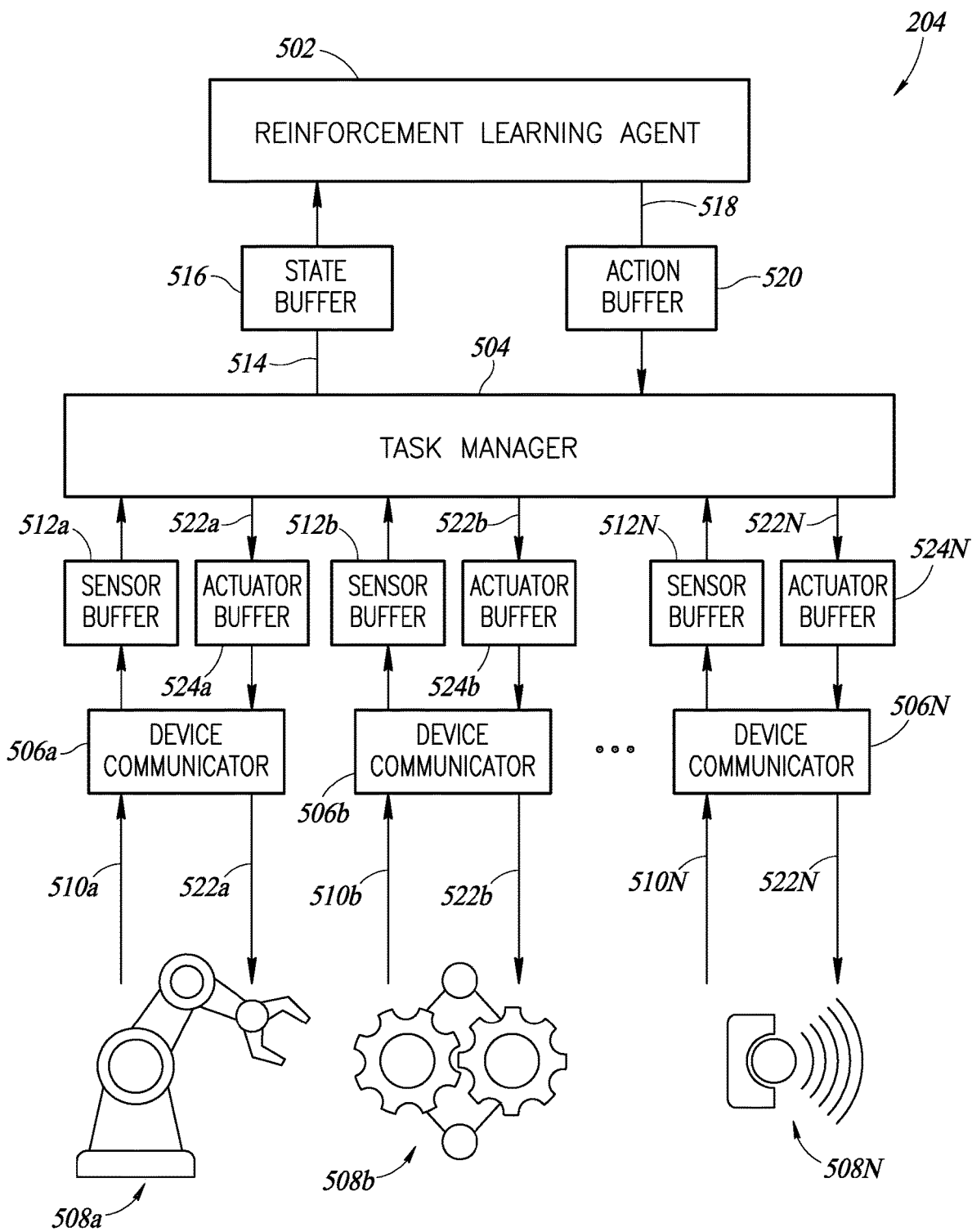
FIG. 5 shows a diagram of the reinforcement learning architecture of FIG. 2 according to one or more embodiments.

FIG. 5 shows a computational environment of the computer system 200 in which the reinforcement learning architecture 204 is implemented according to one or more embodiments. The reinforcement learning architecture 204 includes a reinforcement learning agent 502, a task manager 504 that communicates with the reinforcement learning agent 502, and a plurality of device communicators 506a, 506b, . . . , 506N (collectively referred to as communicators 506) that communicates with the task manager 504 and that communicates with a plurality of devices 508a, 508b, . . . , 508N operating in the environment 202. The reinforcement learning agent 502 is a process running on the one or more processors 438 of the computer system 200 as a result of execution of the set of instructions stored in the memory 440. The task manager 504 is a process running independently of and in parallel with the process of the reinforcement learning agent 502 on the one or more processors 438 of the computer system 200 as a result of execution of the set of instructions stored in the memory 440.

The device communicators 506 are a set of processes running independently of and in parallel with the reinforcement learning agent 502 and the task manager 504 on the one or more processors 438 of the computer system 200 as a result of execution of the set of instructions stored in the memory 440. In some embodiments, each of the device communicators 506 is a process running independently of and in parallel with the other device communicator processes. For instance, the device communicator 506a corresponds to a first process and the device communicator 506b is a second process running independently of and in parallel with the first process. In some embodiments, the device communicators 506 may be implemented collectively as a single process or a plurality of processes fewer in number than the number of device communicators 506. In some situations, the computational resources (e.g., number of processing cycles) associated with a group of device communicators 506 may be relatively low, and so grouping two or more device communicators 506 into a single process may be beneficial.

A first process and a second process are considered as running in parallel with each other if the first process and the second process are being executed by different cores of a processor of the computer system 200 or by different processors of the computer system 200. Thus, the computational performance of a first core or processor associated with execution of the first process does not affect the computational performance of a second core or processor associated with execution of the second process.

Each of the communicators 506 is configured to communicate with a controller of a single one of the devices 508 in the environment 202. For instance, the communicator 506a communicates with a controller of the device 508a, the communicator 506b communicates with a controller of the device 508b, and so on. The number of communicators 506 instantiated on the computer system 200 may correspond to the number of devices 508 that a user has configured the reinforcement learning architecture 204 to control. However, the number of communicators 506 may be more than the number of controllable devices operating in the environment 200—for example, some of the devices 506 may be devices from which sensory data is read (e.g., camera, temperature sensor) and that do not receive actuation commands for operational control of the device. The reinforcement learning architecture 204 includes a user interface with which a user can interact to configure the communicators 506 to communicate with the devices 508. The user may interact with the user interface, for example, to cause the computer system 200 to detect discoverable devices (e.g., the devices 508), determine the set of communicators 506 to be instantiated, and associate each of the set of communicators with a corresponding device of the discoverable devices. Each of the communicators 506 is configured to communicate with a corresponding device of the devices 508 via the communication interface 442 described herein.

Each of the devices 508a, 508b, . . . , 508N may send sensory data 510a, 510b, . . . , 510N regarding a state of the respective device, such as position, speed, orientation, etc. In some embodiments, the devices 508 may continuously send the sensory data 510 as a data stream comprising a sequence of discrete encoded signals or packets. For instance, one or more of the communicators 506 may send a command to corresponding devices 508 instructing the controllers to make the sensory data 510 available in a streaming manner. In some embodiments, one or more of the devices 508 send the sensory data 510 in response to receiving a request from a communicator 506 to provide the sensory information 510—for instance, in response to a communicator sending a read command to a corresponding controller of a device. The read command may cause the communicator 506 to wait for a packet arrival period $P_A$ having a length of time $t_1$. The communicators 506 respectively receive the sensory data 510a, 510b, . . . , 510N from corresponding devices 508a, 508b, . . . , 508N operating in the environment 202. The sensory data 510 for sensor devices is a scalar value having an alphanumeric format; however, in some embodiments, the sensory data 510 may be an array of scalar values for some types of sensor data, such as image data.

The reinforcement learning architecture 204 includes a plurality of sensor buffers 512a, 512b, . . . , 512N (collectively referred to as sensor buffers 512) each respectively associated with or coupled to a corresponding communicator of the communicators 506a, 506b, . . . , 506N. In response to receiving the sensory data 510, the communicators 506a, 506b, . . . , 506N store the sensory data 510a, 510b, . . . , 510N in the associated sensor buffer of the plurality of sensor buffers 512a, 512b, . . . , 512N. Each of the sensor buffers 512 is a data structure in the memory 440 configured to store sensory data 510. The sensor buffers 512 may be, for instance, circular buffers having a defined size and in which the sensory data 510 is sequentially written to memory locations in the buffer and, subsequent to data being written to an end memory location of the buffer, data at a starting memory location of the circular buffer is overwritten with new data. Each of the sensor buffers 512 may have a size and/or configuration defined based on the device 508 with which the sensor buffer 512 is associated. For instance, a sensor buffer 512 for storing image data from a camera may be assigned a significantly larger amount of memory than a sensor buffer for storing data from a servomotor. Each of the sensor buffers 512a, 512b, . . . , 512N may store samples of sensory data 510 obtained by a corresponding device 508 for a plurality of times.

The task manager 504 obtains the sensory data 510 stored in the sensor buffers 512 and processes the sensory data 510. In particular, the task manager 504 reads the next unread sensory data 510a, 510b, . . . , 510N from each of the sensory buffers 512a, 512b, . . . , 512N and generates a joint state vector 514 based on the sensory data 510a, 510b, . . . , 510N read. The joint state vector 514 may include observation data and reward data to be used in a reinforcement learning algorithm implemented by the reinforcement learning agent 502. The joint state vector 514 may be organized as an array of elements that sequentially correspond to the devices 508a, 508b, . . . , 508N. For instance, a first element of the joint state vector 514 may correspond to the device 508a, a second element of the joint state vector 514 may correspond to the device 508b, and so forth.

The computer system 200 includes a defined objective, such as a task or goal to be achieved, in the environment 202. The task manager 504 evaluates states of the environment 202, e.g., as observed in view of the state data 510, and actions performed in the environment 202, e.g., in view of actuation commands 522 provided by the reinforcement learning agent 502, and generates the joint state vector 514 based on a result of the evaluation. The joint state vector 514 may include a plurality of values that correspond to observations of the environment 202 (e.g., device readings) and values that correspond to rewards associated with one or more states in the environment 202. The defined objective may correspond to a set of defined conditions stored in the memory 440 that the task manager 504 accesses to assess states and actions. The joint state vector 514 may include reward information that is representative of a change in the state of the environment 202 as a result of a set of preceding action commands with respect to the defined objective. For instance, a positive reward may indicate that the last actions provided by the reinforcement learning agent 502 progressed the state of the environment closer to achieving the defined objective whereas a negative reward may indicate that the last actions provided by the reinforcement learning agent 502 regressed the state of the environment 202 farther from achieving the defined objective. The task manager 504 may consider a long-term value of the current state of the environment 202 or estimated return of the last actions when generating the joint state vector 514, such as by adjusting the reward to account for a more favorable long-term result of the state of the environment 202.

The task manager 504 stores the joint state vector 514 in a state buffer 516 in the memory 440. The reinforcement learning agent 502 obtains the joint state vector 514 from the state buffer 516 and determines, according to a policy π defined in the reinforcement learning agent 502, a set of actions to be performed by the devices 508a, 508b, . . . , 508N based on perceived states of the environment 202, as indicated by the joint state vector 514.

The policy π is a set of instructions stored in the memory 440 that cause the process of the reinforcement learning agent 502 to generate an action in response to observation data and/or reward data in the joint state vector 514. The policy it maps states of the environment 202, such as states of the devices 508, to actions to be performed in response to the detected states. The policy π is defined by a user based on tasks, goals, or desired end states to be achieved in the environment 202. The policy π may have associated therewith values V or action-values Q indicating a long-term return or value for achieving the task based on a state of the environment 202. The reinforcement learning agent 502 may also perform a learning-update process in which learning parameters (e.g., weights, biases) of the reinforcement learning model are adjusted to improve the ability of the reinforcement learning agent 502 to achieve the desired task, goal, end state, etc., in the environment 202. The policy π may include a probability distribution indicating probabilities of a next state and/or reward that would be achieved in response to performing a particular action in response to a given state. For example, the probability distribution may indicate the probabilities associated with each of a discrete set of defined actions of causing a robotic arm to progress to a more desirable state relative to a goal of picking up an object.

The reinforcement learning agent 502 generates, according to the policy π, a joint action vector 518 that includes actuation commands indicating actions to be performed by the corresponding devices 508 in the next time period. For instance, the joint action vector 518 indicates a first action to be performed by the device 508*a*, a second action to be performed by the device 508*b*, and so on. The reinforcement learning agent 502 stores the joint action vector 518 in an actuation buffer 520. As a result of generating and storing the joint action vector 518, the reinforcement learning agent 502 returns to the suspended state for the period of time $P_S$. The action buffer 520 is a region allocated in the memory 440 for storing the joint action vector 518. The action buffer 520 is a shared region in the memory that is shared between the task manager 504 and the reinforcement learning agent 502, and which is inaccessible to other processes executing in the computer system 200.

The period of time $P_S$ may be determined by the reinforcement learning agent 602 based on a step time S for the reinforcement learning agent 502. The step time S may be a defined period of time (e.g., by a user) that includes the time period $P_S$ in which the reinforcement learning agent 502 operates in a suspended state, and a time period $P_A$ in which the reinforcement learning agent 502 operates in the active state, such that the following Equation 1 is satisfied:

$$S = P_S + P_A \quad [1]$$

A step time S of 100 ms, for example, may be defined for the reinforcement learning agent 502 by a user. The reinforcement learning agent may transition from the suspended state to the active state and obtain a joint state vector 514 from the state buffer 516 in the active state. An amount of time that it takes for the joint state vector 514 may vary depending on various factors associated with the joint state vector 514, such as the number of observations comprising the joint state vector 514. In a first example iteration of the reinforcement learning architecture 204, it may take the reinforcement learning agent 27 ms to process the joint state vector 514 and store the joint action vector 518 generated in the action buffer 520. Thus, the reinforcement learning agent 502 determines that the active time period $P_A$ is 27 ms and that the suspended time period $P_S$ is 73 ms based on Equation 1. The reinforcement learning agent 502 transitions from the active state to the suspended state for the remaining 73 ms of the step time S. In a second example iteration after the first example iteration, the reinforcement learning agent 502 may spend a greater amount of time in the active state due, e.g., to a higher overall CPU load sufficient to process another joint state vector 514. In which case, the reinforcement learning agent 502 operates in the active state for a shorter time period than the first example iteration to ensure that the step times S for each iteration is approximately equal to the desired step time S of 100 ms.

The task manager 504 obtains the joint action vector 518 from the action buffer 520 and parses the joint action vector 518 into actuation commands 522*a*, 522*b*, . . . , 522N indicating actions that are to be performed by the devices 508*a*, 508*b*, . . . , 508N. Each instance of the actuation commands 522 may have a format particular to the corresponding device 508 to which the instance of actuation commands 522 is to be transmitted. Individual instances or elements of the actuation commands 522 may be a value specifying both magnitude and direction—for instance, a positive floating point value of the actuation commands 522 may cause a device to move in a certain direction by an amount corresponding to the value.

The reinforcement learning architecture 204 includes a plurality of actuator buffers 524*a*, 524*b*, . . . , 524N that each correspond to one of the device communicators 506*a*, 506*b*, . . . , 506N. Each of the actuator buffers 524*a*, 524*b*, . . . , 524N is a data structure in the memory 440 each configured to store an instance or element of data of the one or more actuation commands 522*a*, 522*b*, . . . , 522N. Each of the actuator buffers 524*a*, 524*b*, . . . , 524N is, for example, a circular buffer having a defined size and in which the actuation commands 522 is sequentially written to memory locations in the buffer and, subsequent to data being written to an end memory location of the buffer, data at a starting memory location of the circular buffer is overwritten with new data. Each of the action buffers 524 may have a size and/or configuration defined based on the device 508 with which the action buffer 524 is associated. For instance, a first buffer of the action buffers for storing data for operating a robotic arm may have a different size or configuration than a second buffer of the action buffers 524 for operating a conveyor belt.

The task manager 504 loads each data element or instance of the actuation commands 522*a*, 522*b*, . . . , 522N parsed from the joint action vector 518 into a corresponding buffer of the action buffers 524. The task manager 504, as an example, may parse and store a first element from the joint action vector 518 into the action buffer 524*a*, may parse and store a second element from the joint action vector 518 into the action buffer 524, etc., until all elements of the joint action vector 518 are stored in a corresponding action buffer 524. In some embodiments, the task manager 524 may store the actuation commands 522*a*, 522*b*, . . . , 522N in the actuator buffers 524*a*, 524*b*, . . . 524N sequentially in the order in which the actuation commands are parsed. In some embodiments, the task manager 524 may parse the entire joint action vector 518 and then store the actuation commands 522 obtained therefrom to the actuator buffers 524. In some implementations, the joint action vector 518 may not include an action element for each of the devices 508—for example, action elements may not be provided for inactive devices (e.g., cameras, measurement sensors) that do not move or interact on the environment 202. In some embodiments, a null or zero value may be assigned for action elements corresponding to inactive devices in the environment 202.

Thereafter, each of the device communicators 506*a*, 506*b*, . . . , 506N obtains the actuation commands 522*a*, 522*b*, . . . , 522N stored in a corresponding one of the actuator buffers 524*a*, 524*b*, . . . , 524N. The communicators 506 then transmit the actuation commands 522 to the associated device 508, thereby causing the associated device 508 to perform according to the actuation commands provided.

Figure 6:
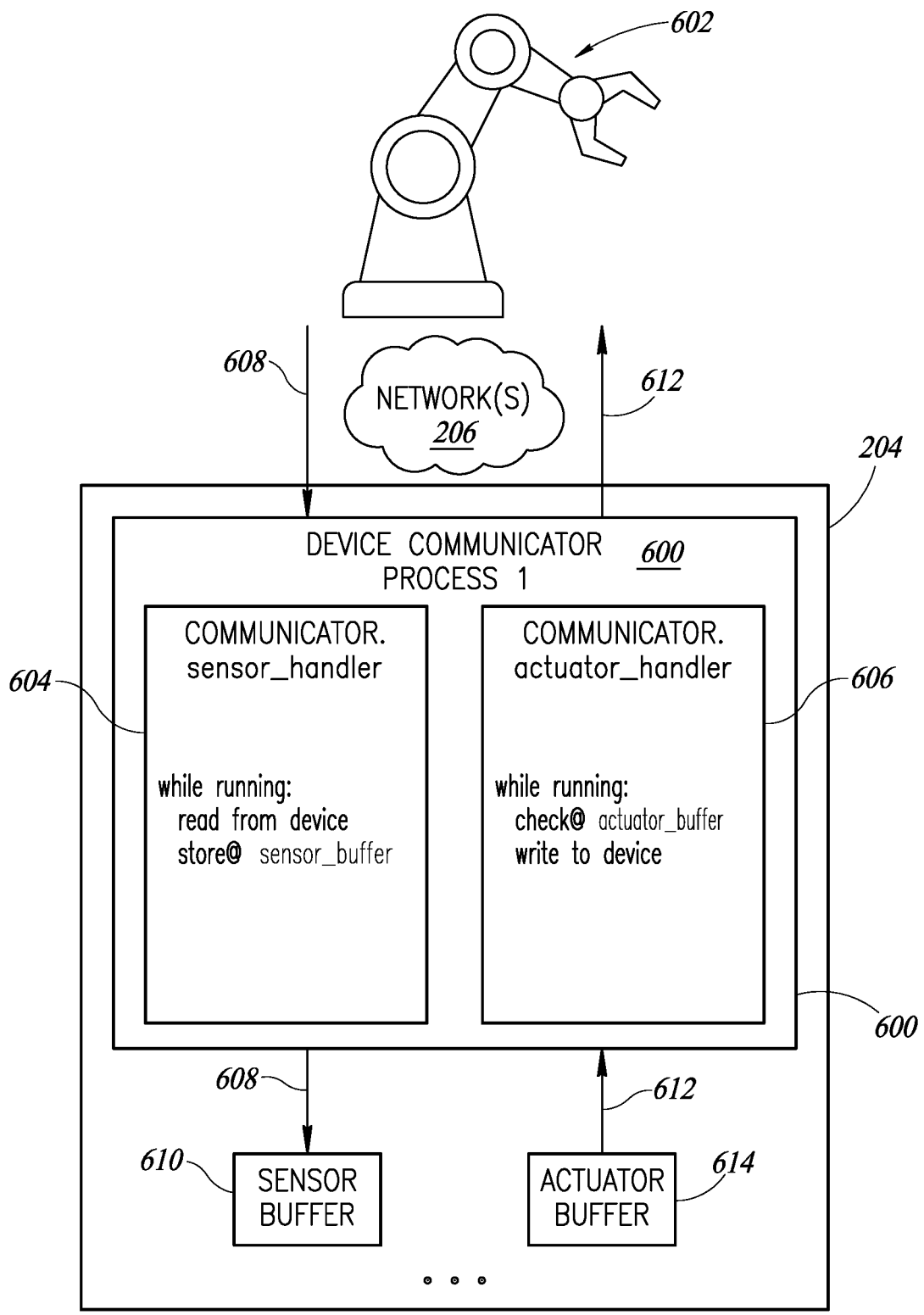
FIG. 6 shows a device communicator of the reinforcement learning architecture.

FIG. 6 shows a computational environment of the computer system 200 in which a communicator process 600 of the reinforcement learning architecture 204 operates to communicate with a device 602 according to one or more embodiments. The communicator process 600 is a multi-threaded process corresponding to the device communicator 506 of FIG. 5 and elsewhere herein. The communicator process 600 is assigned to the device 602 and dedicated to receiving sensory data from the device 602 and transmitting actuation commands to the device 602. As described above, the reinforcement learning architecture 204 may include a communicator process 600 for each device 602 to be controlled by the reinforcement learning architecture 204 in the environment 202.

The communicator process 600 executes independently of the reinforcement learning agent 502 and the task manager 504. The communicator process 600 is a multi-threaded process executing in the computer system 200 that includes a read thread 604 and a write thread 606. The read thread 604 and the write thread 606 may execute in different cycles of the communicator process 600. For instance, operations may be performed by a processor of the computer system 200 according to instructions of the read thread 604 for a first set of cycles and operations may be performed by the processor of the computer system 200 for a second set of cycles different than the first set.

The read thread 604 is dedicated to reading and storing sensory data from the device 602. In particular, while the reinforcement learning architecture 204 is running, the read thread 604 reads sensory data 608 transmitted by the device 602 over the network 206, and stores the sensory data 608 in a sensor buffer 610, which may be a circular buffer dedicated to the particular communicator process 600. The sensory data 608 may be received as a data packet or a sequence of data packets. Storing the sensory data 608 in the circular buffer may cause a write pointer associated with the circular buffer to be updated. In some embodiments, the read thread 604 may evaluate whether the sensory data 608 provided by the device 602 is valid before storing the sensory data 608 in the sensor buffer 610.

The write thread 606 is dedicated to obtaining actuator commands provided by the task manager 504 and transmitting the actuator commands to the device 602. While the reinforcement learning architecture 204 is running, the write thread 606 reads an actuation command 612 from an actuator buffer 614 and causes the actuation command 612 to be transmitted to the device 602 over the network 206. The actuation buffer 614 may be a circular buffer, and reading the actuation command 612 from the actuation buffer 614 may cause a read pointer associated with the circular buffer to be updated. The actuation buffer 614 may wait for the actuation buffer 614 to be updated before reading the actuation command 612 in some instances—e.g., if the write pointer of the actuation buffer 614 matches the read pointer, the write thread 606 may wait until the write pointer is updated before reading the actuation command 612 therefrom.

Figure 7:
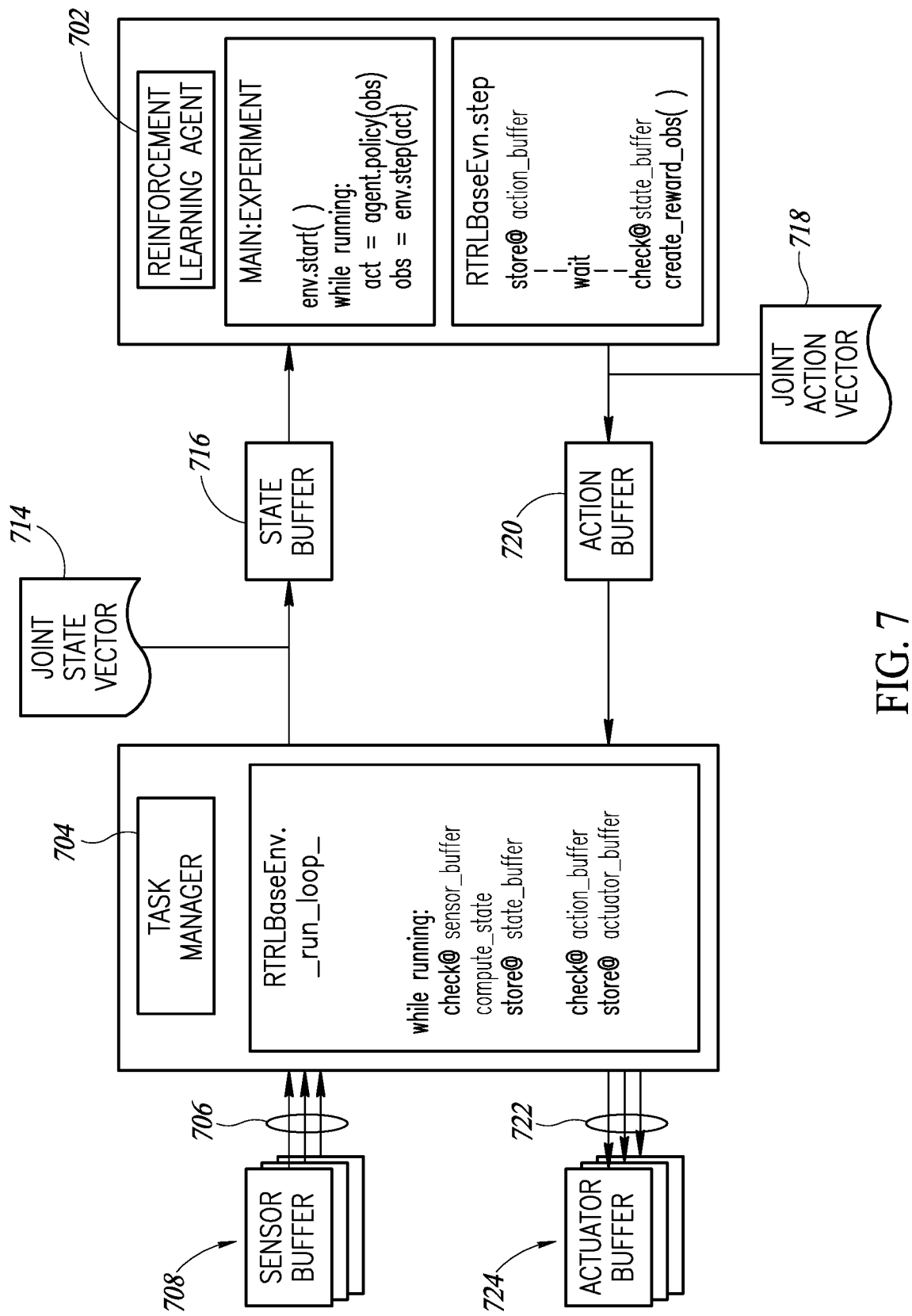
FIG. 7 shows a task manager and a reinforcement learning agent of the reinforcement learning architecture.

FIG. 7 shows a computational environment of the computer system 200 in which a reinforcement learning agent 702 of the reinforcement learning architecture 204 interacts with a task manager 704 to control operations of devices operating in the environment 202 according to a reinforcement learning policy π. The reinforcement learning agent 702 and the task manager 704 are respective embodiments of the reinforcement learning agent 502 and the task manager 504 described herein. The reinforcement learning agent 702 is a first process of the reinforcement learning architecture 204 running on a first processor of the computer system 200 and the task manager 704 is a second process of the reinforcement learning architecture 204 running on a second processor of the computer system 200. The reinforcement learning agent 702 process is independent of the process of the task manager 704.

The task manager 704 obtains a plurality of sensory data 706 from a plurality of sensor buffers 708 each associated with a corresponding communicator process. The task manager 704 may obtain the plurality of sensory data 706 collectively as a unit—for instance, by executing read operations to read the plurality of sensory data 706 from the sensor buffers 708 in parallel. The task manager 704 may track the status of the sensor buffers 708 and read sensory data from one or more of the sensor buffers 708 in response to detecting an update to a sensor buffer (e.g., change in a write pointer).

The task manager 704 generates a joint state vector 710 based on the plurality of sensory data 706 obtained from the plurality of sensor buffers 708. Generating the joint state vector 710 may include generating observation data and may include generating reward data. The observation data may correspond to an observed state of the environment 202, such as the relationship of the devices operating in the environment 202 to achieving a defined objective (e.g., picking up an object and placing it in a box). The reward data may correspond to a contribution of the preceding actions commanded by the reinforcement learning agent 702 in relation to achieving the defined objective—for example, an amount of progress made toward or away from the defined objective as a result of performance of previous action commands.

The task manager 704 stores the joint state vector 710 in a state buffer 716. The state buffer 716 is a region allocated in the memory 440 for storing the joint state vector 714. The size of the state buffer 716 may be determined based on characteristics of the sensory data 706 provided by the devices 508 operating in the environment 202. The state buffer 716 is a shared region in the memory that is shared between the task manager 704 and the reinforcement learning agent 702, and which is inaccessible to other processes executing in the computer system 200. The task manager 704 may update the joint state vector 710 as a result of detecting an update or change in sensory data 706 stored in one or more of the sensor buffers 708. The task manager 704 may calculate a new joint state vector 710 for each change detected or update a portion of the joint state vector 710.

The reinforcement learning agent 702 obtains the joint state vector 714 from the state buffer 716 and invokes a policy π to determine a response based on the joint state vector 714. The reinforcement learning agent 702 transitions between a suspended state in which the joint state vector 714 is not read from the state buffer 716 and processed, and an active state in which the reinforcement learning agent 702 obtains and processes the joint state vector 714.

In the active state, the reinforcement learning agent 702 determines, according to the policy π, a set of actions to be performed by the devices 508a, 508b, . . . , 508N based on perceived states of the environment 202, as represented by the joint state vector 714. The reinforcement learning agent 702 operates in the suspended state for a step or period of time $P_S$, then obtains and processes a single joint state vector 714, and then returns to the suspended state for the period of time $P_S$. The period of time $P_S$ is a defined operating parameter of the reinforcement learning agent 702 and which may be selectively adjustable by a user.

In the active state, the reinforcement learning agent 702 generates a joint action vector 718 based on the joint state vector 714 and stores the joint action vector 718 in an action buffer 720. The joint action vector 718 may be organized as an array of elements that sequentially correspond to actions to be performed by corresponding devices 508a, 508b, . . . , 508N, as described with respect to the joint state vector 714. For instance, a first element of the joint action vector 718 may correspond to the device 508a, a second element of the joint action vector 718 may correspond to the device 508b, and so forth. The reinforcement learning agent 702 may transition back and forth between the suspended state and the active state while the reinforcement learning architecture 204 is running.

The joint action vector 718 includes actuation commands that cause corresponding devices 508 operating in the environment 202 to perform the actions specified therein. For instance, the joint action vector 718 may indicate a first action to be performed by the device 508a, a second action to be performed by the device 508b, and so on, when received by the devices. As a result of generating and storing the joint action vector 718, the reinforcement learning agent 702 returns to the suspended state for the period of time $P_S$. The action buffer 720 is a region allocated in the memory 440 for storing the joint action vector 718. The action buffer 720 is a shared region in the memory that is shared between the task manager 704 and the reinforcement learning agent 702, and which is inaccessible to other processes executing in the computer system 200.

The task manager 704 reads the joint action vector 718 from the action buffer 720. The task manager 704 may monitor the action buffer 720 and wait until the action buffer 720 is populated or updated with the joint action vector 718 in response to storing the joint state vector 714 in the state buffer 716. The task manager 704 parses the joint action vector 718 into a plurality of actuation commands 722 and distributes each of the actuation commands 722 parsed to an actuation buffer of a plurality of action buffers 724. Each of the action buffers 724 is associated with a communicator, such as the communication process 600.

Figure 8:
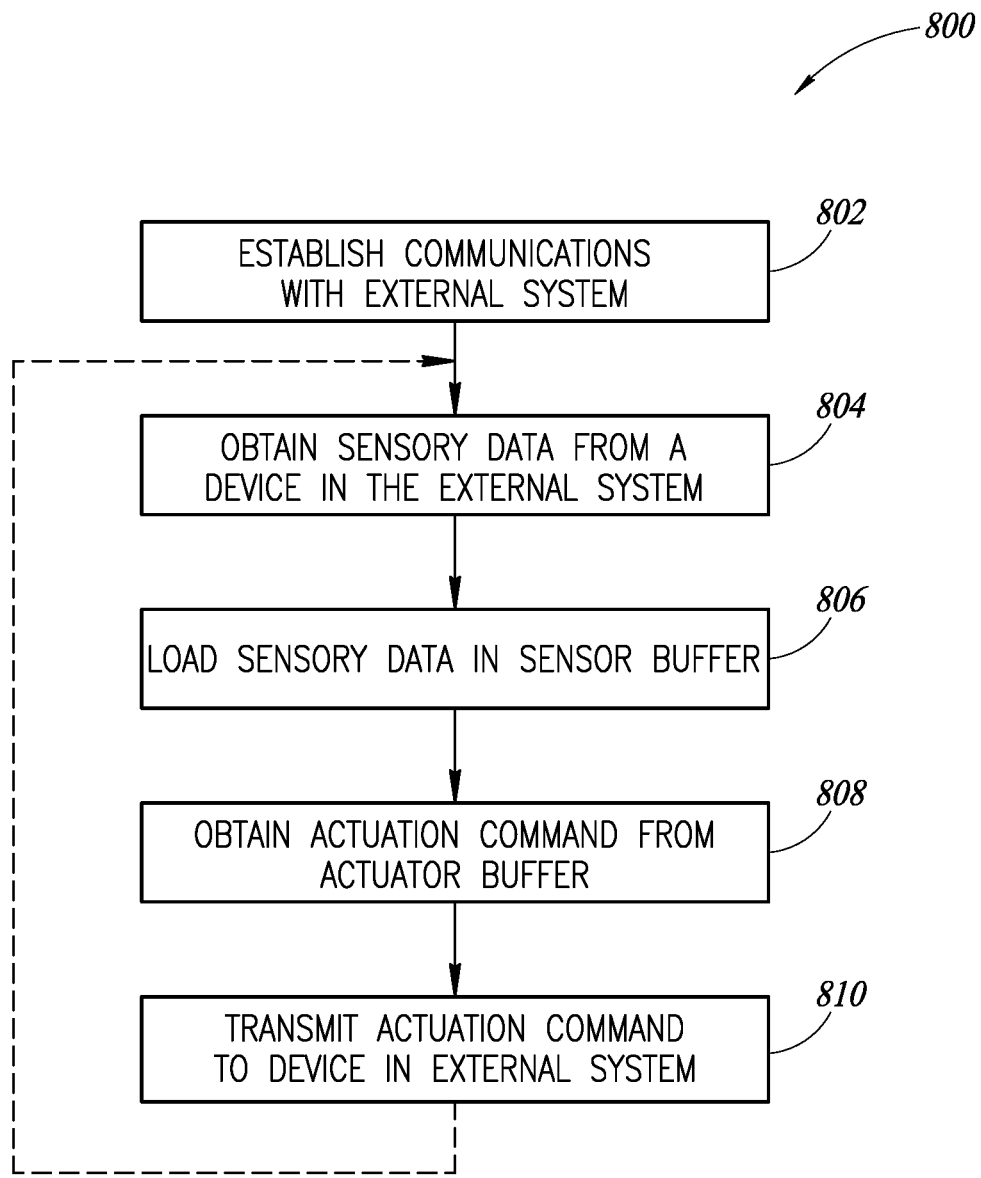
FIG. 8 shows a method of operation of the device communicator of the reinforcement learning architecture.

FIG. 8 shows a method of operation of a device communicator of the reinforcement learning architecture 204, such as the device communicators 506 or the communicator process 600, according to one or more embodiments. As described elsewhere herein, the device communicator is a process running on a processor of the computer system 200 and is a process different than processes of the task manager and the reinforcement learning agent. Each device communicators may perform the method 800 independently of and in parallel with other device communicators of the reinforcement learning architecture 204. The method 800 includes establishing 802 communications with device operating in the environment 202 over the network 206. Establishing 802 communications may include establishing a communication channel according to one or more defined communication protocols. For instance, the device communicator may cause the communication interface 442 to establish a Wi-Fi connection with the corresponding device or "pair" with the corresponding device according to a Bluetooth protocol. In connection with establishing 802 communications with the device, the device communicator may send a command to the device causing it to transition to a data streaming mode in which the device streams sensory data, e.g., in a continuous sequence of data packets.

Thereafter, the method 800 includes obtaining 804 sensory data from the device indicating a measured state of device by a sensor associated with the device. In some implementations, the device communicator may invoke a read operation to obtain a data packet or a set of data packets of sensory data from the data stream. In some implementations, the device communicator may cause the communication interface 442 to send a request to the corresponding device to provide sensory data. The method 800 then includes loading 806 the sensory data obtained in 804 into a sensor buffer, as described with respect to FIGS. 5, 6, and 7, such as an element in a circular buffer. The device communicator may verify whether the sensory data is valid (e.g., not corrupt, readable) as a condition precedent to loading 806 the sensory data into a sensor buffer. Each of the device communicators is configured to independently load, in 806, sensory data into a corresponding sensor buffer associated therewith. Obtaining 804 and loading 806 may comprise a cycle performed by the read thread 604 during which the write thread 606 is blocked or prevented from performing operations.

Then, the device communicator obtains 808 an actuation command from an actuator buffer. For instance, the write thread 606 of the device communicator may track the status of the actuator buffer associated with the device communicator. In response to detecting a change, the write thread 606 may read the actuation command from the actuator buffer. The write thread 606 may perform a read operation from the actuator buffer that a read pointer as a result of detecting that the read pointer of the actuator buffer does not match the write pointer. The actuation command obtained in 808 may be a command in response to the sensor data loaded in 806. Responsive to successfully obtaining 808 an actuation command from the actuator buffer, the method includes transmitting 810 the actuation command to the device associated with the device communicator. In particular, the device communicator causes the communication interface 442 to transmit the actuation command over the network 206 to cause the device to perform the action specified in the actuation command in the environment 202. Obtaining 808 and transmitting 810 may comprise a cycle performed by the write thread 606 during which the read thread 604 is blocked or prevented from performing operations.

The operations of the method 800 may be performed in a different order than shown in FIG. 8. For instance, obtaining 808 and transmitting 810 may be performed before obtaining 804 and loading 806. The method 800 may be an iterative process in which portions of the method are repeatedly performed. The method 800 may return to obtain 804 sensory data from a device operating in the environment 202 subsequent to transmitting 810 the action data.

Figure 9:
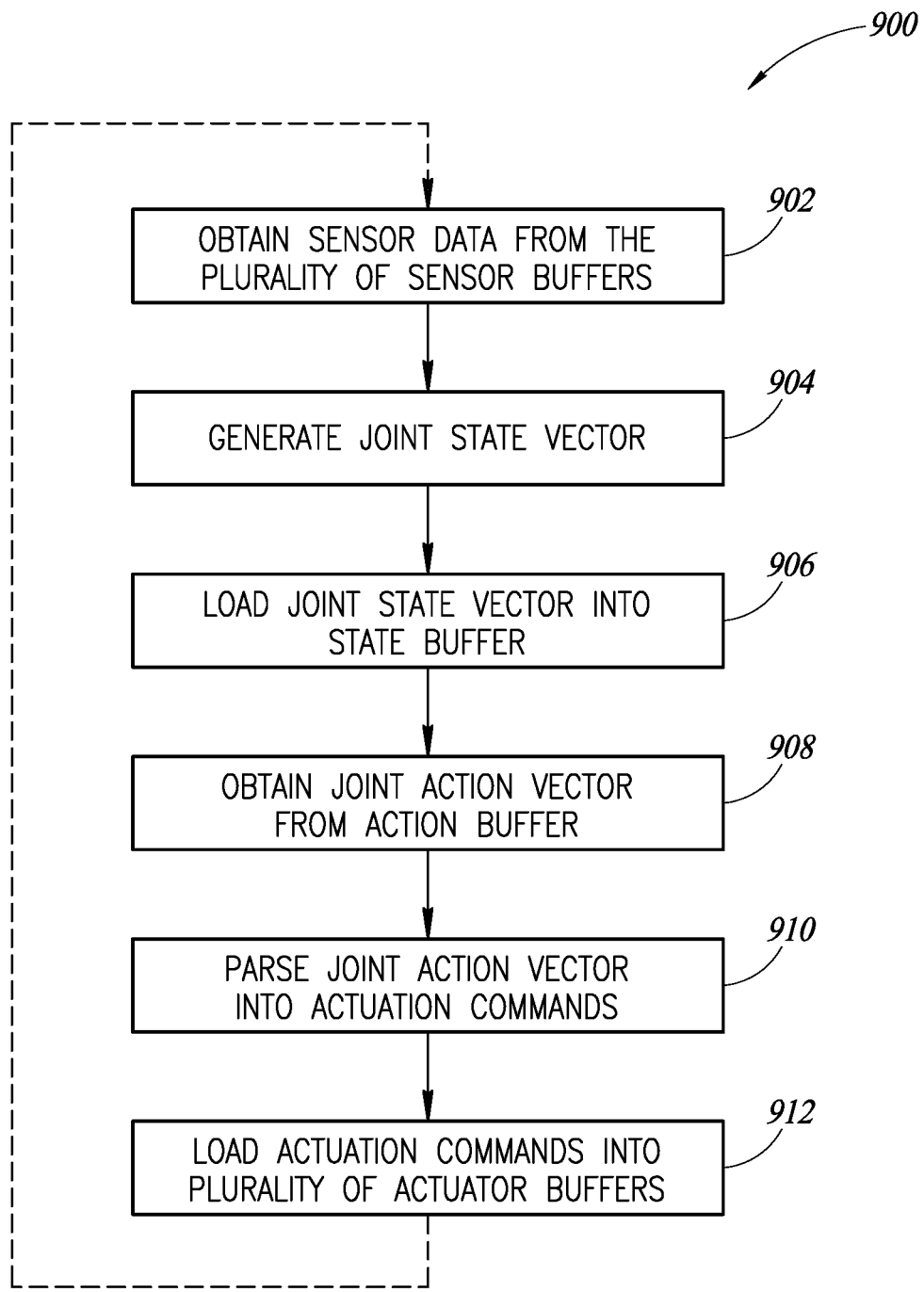
FIG. 9 shows a method of operation of the task manager of the reinforcement learning architecture.

FIG. 9 shows a method of operation of a task manager of the reinforcement learning architecture 204, such as the task manager 504 or the task manager 704, according to one or more embodiments. As described herein, the task manager is a process running on a processor of the computer system 200 and is a process that is different than the processes of the device communicator and the reinforcement learning agent. The method 900 includes obtaining 902 sensor data from the plurality of sensor buffers. For instance, the task manager may read a single instance of sensor data from each of the plurality of sensor buffers.

The method 900 includes generating 904 a joint state vector representative of the sensor data obtained in 902. Generating 904 the joint state vector may include calculating observation data representative of a state of the environment 202 relative to a defined objective of the task manager and reward data representative of progress toward or away from the defined objective as a result of performing a preceding set of actions. In some previously-implemented solutions, a reinforcement learning agent would sequentially obtain sensory data and process the data to determine what actions to take, which can cause a disconnect between action and effect in the feedback loop of reinforcement learning due to time delays, thereby inhibiting the ability of the reinforcement learning agent to effectively and efficiently learn to achieve the defined objective.

Generating 904 the joint state vector by the task manager has numerous benefits over these previous approaches. For example, because the communicators operate independently and in parallel with each other, the sensory data stored is effectively correlated with a more precise period of time in contrast to the sequential collection of information in previous implementations. Additionally, generating 904 a joint state vector helps to distribute computational resources of the reinforcement learning agent into a separate process, thereby decreasing computational resources used by the reinforcement learning agent to determine a set of actions to be performed. This procedure also improves the learning progress of the reinforcement learning agent by reducing latency in the system and improving the temporal coherence of the sensor data.

The method 900 includes loading 906 the joint state vector into a state buffer of the reinforcement learning architecture 204, such as the state buffer 516 or the state buffer 716. The method 900 further includes obtaining 908 a joint action vector from an action buffer of the reinforcement learning architecture 204, such as the action buffer 520 or the action buffer 720. Obtaining 908 the joint action vector is in response to loading 906 the joint state vector. For instance, subsequent to loading 906, the task manager waits until the action buffer is updated with a new joint action vector, at which point the task manager reads the joint action vector from the action buffer.

The method 900 further involves parsing 910 the joint action vector into actuation commands to be transmitted to the devices operating in the environment 202. Parsing 910 the joint action vector may include checking boundaries and constraints of the environment 200 and evaluating a risk associated with execution of the actuation command by the corresponding device in the environment 200. For example, the task manager may determine whether performance of the actuation command would result in a collision; exceed defined safety boundaries of the environment 200; pose a risk to persons, animals, property, etc., in the environment 200, etc. The boundaries and constraints of the environment 200 may be a defined set of rules or physical boundaries associated with the environment 200 that performance of the actuation command should not violate. If the risk associated with performance of the actuation command would violate or exceed a defined boundary or constraint, the task manager may elect not to send the actuation command(s). Evaluating the risk of performance of the actuation command is a non-trivial procedure that, when executed asynchronously by the task manager, facilitates reduction of further delays or events that could be adverse to achievement of the defined objective in an efficient manner and according to the reinforcement learning model.

The method 900 also includes loading 912 the actuation commands into the plurality of actuator buffers. The task manager, in some embodiments, may parse 910 each actuation command from the joint action vector and then load 912 the actuation commands into the actuator buffers. In some embodiments, the task manager may load 912 each actuation command into a corresponding actuation buffer after it is parsed 910 from the joint action vector and before parsing 910 the next actuation command of the joint action vector.

The operations of the method 900 may be performed in a different order than shown in FIG. 9. For instance, obtaining 908, parsing 910, and loading 912 may be performed before obtaining 902, generating 904, and loading 906. The method 900 may be an iterative process in which portions of the method are repeatedly performed. For example, the method 900 may return to obtain 902 sensory data from the plurality of sensor buffers subsequent to loading the actuation commands in 912.

Figure 10:
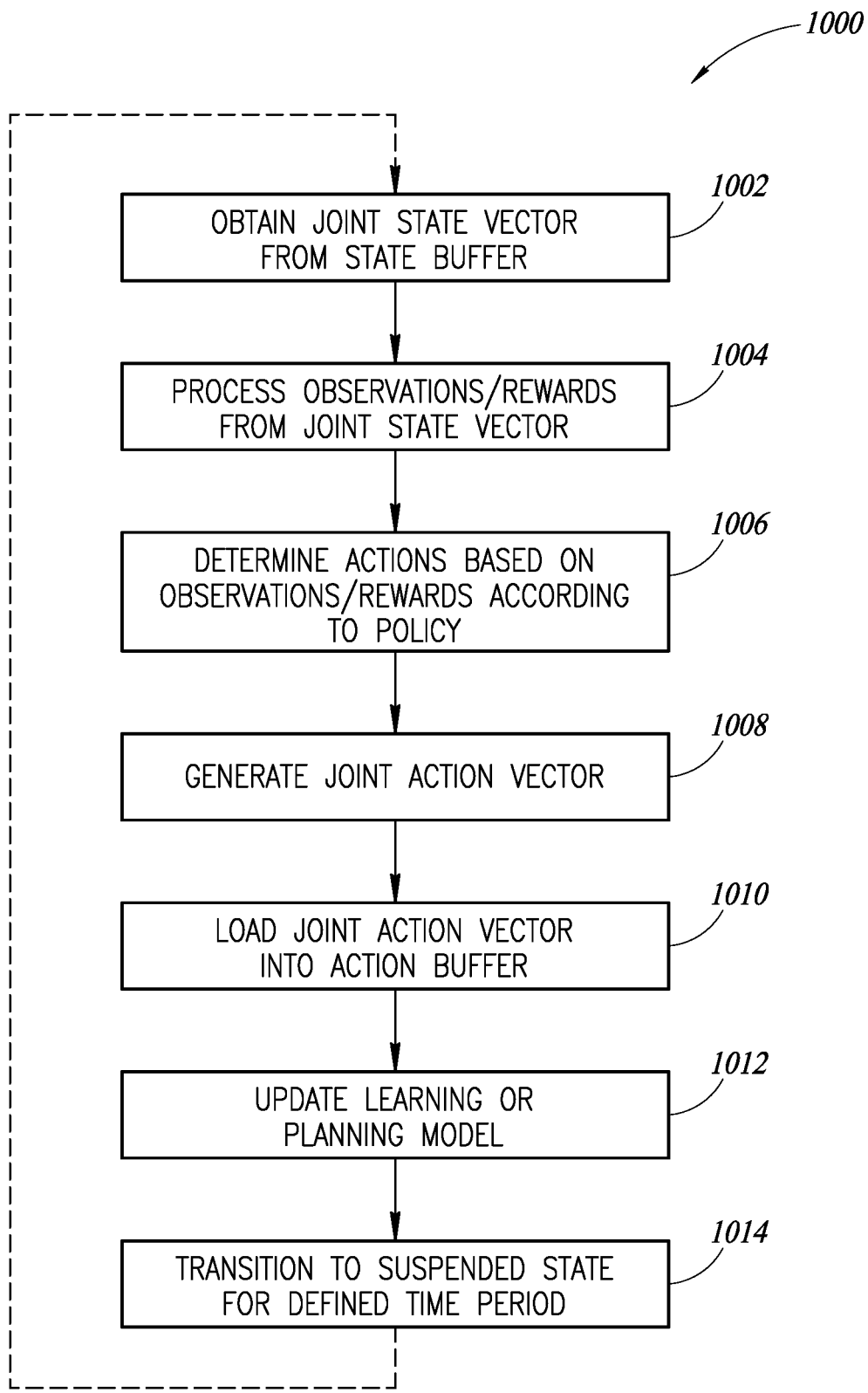
FIG. 10 shows a method of operation of the reinforcement learning agent of the reinforcement learning architecture.

FIG. 10 shows a method 1000 of operating a reinforcement learning agent of the reinforcement learning architecture 204, such as the reinforcement learning agent 502 or the reinforcement learning agent 702. As described herein, the reinforcement learning agent is a process running on a processor of the computer system 200 and is a process that is different than the processes of the device communicator and the task manager.

The method 1000 includes obtaining 1002 a joint state vector from a state buffer, which was loaded by the task manager in 906. Obtaining 1002 may be performed by the reinforcement learning agent after transitioning from the suspended state to the active state after a defined period of time $P_S$ in the suspended state. Then, the method 1000 involves processing 1004 observation information and/or reward information included in the joint state vector obtained in 1002. The method 1000 further includes determining a set of actions to be performed by the devices operating in the environment 202 based on a policy $\pi$ of the reinforcement learning agent. For instance, the reinforcement learning agent may execute a function corresponding to the policy $\pi$ using the observation information as an input thereto. An output of the policy $\pi$ may be the joint action vector that is representative of the actions to be performed in the environment 200 to achieve a next state. The reinforcement learning agent generates 1008 a joint action vector based on the set of actions determined in 1006 and loads 1010 the joint action vector into the action buffer. The reinforcement learning agent may be unaware of the specific devices operating in the environment 200 and so the joint action vector generated in 1008 may indicate a state change of the environment 200 to be performed to progress the state of the environment 200 closer to the defined objective.

The method 1000 may optionally include updating 1012 a learning model or planning model of the reinforcement learning agent based on the joint state vector and a previous joint action vector generated that caused a state change in the environment 202 corresponding to the joint state vector. Updating the learning model may include updating the policy $\pi$ based on the reward information and value information optionally associated therewith. Updating the policy $\pi$ is part of the reinforcement learning process by which the reinforcement learning agent improves its efficiency and effectiveness to perform the defined objective. Updating 1012 may include updating weights or biases of the policy $\pi$, a value function, a Q-value function, or other functions of the reinforcement learning agent.

The method 1000 includes transitioning 1014 the reinforcement learning agent from the active state into the suspended state for a defined period of time $P_S$. The defined period of time $P_S$ may be a user defined amount of time, such as 100 milliseconds, during which the reinforcement learning agent does not obtain 1002 or process 1004 a new joint state vector from the state buffer. The reinforcement learning agent, in some embodiments, may perform certain operations while in the suspended state. For instance, at least some operations of updating 1012 may be performed when the reinforcement learning agent is in the suspended state for the period of time $P_S$. As a result of loading 1010 the joint action vector into the action buffer, the reinforcement learning agent may transition 1014 to the suspended state before or without updating 1012 the learning or planning model. Updating the learning or planning model 1012 during the suspended state may improve the efficiency of the reinforcement learning agent. The period of time $P_S$ should be selected, in such instances, to provide sufficient time for the reinforcement learning agent to complete the updating 1012.

The method 1000 is an iterative process which then returns to obtain 1002 the joint state vector from the state buffer subsequent to expiration of the period of time $P_S$.

The reinforcement learning architecture 204 may be implemented in a computer programming developing environment and compiled as a set of computer-readable instructions that the computer system 200 is configured to execute to perform the operations described herein. Each of the communicator, the task manager, and the reinforcement learning agents may be separate classes in an object-oriented programming language, such as Python or C++. The communicators may be configured according to the desired device with which each communicator is specifically intended to communicate. The buffer sizes and configurations may also be determined via input provided by a user. In some embodiments, a user interface may be provided for receiving user input regarding the devices in the environment 202, the objective to be achieved, the reinforcement learning model to be implemented by the reinforcement learning agent, network information, etc. As a result of receiving the user input via the user interface, the computer system 200 may generate the reinforcement learning architecture 204. The reinforcement learning architecture 204 may further include a user interface for facilitating user operation of the reinforcement learning agent 104.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   establishing, via one or more communication interfaces, communications with an external real-time system comprising a plurality of robots;
   obtaining, by a set of first processes executing on a computer system, a plurality of state data respectively indicating states of the plurality of robots;
   generating, by a second process executing on the computer system, a joint state vector based on the plurality of state data stored in a plurality of first buffers;
   transitioning, by a third process executing on the computer system, from a suspended state, in which the third process operates for a predefined period of time and does not obtain or process another joint state vector, to an active state;
   generating, by the third process during the active state, a joint action vector based on the joint state vector according to a defined policy of the third process;
   transitioning, by the third process in response to generating the joint action vector, back to the suspended state;
   parsing, by the second process, the joint action vector into a plurality of actuation commands respectively indicating operations for each of the plurality of robots to perform; and
   controlling, by each of the set of first processes, at least one robot of the plurality of robots to take an action, wherein controlling the at least one robot comprises:
      transmitting, via the one or more communication interfaces, respective actuation commands of the plurality of actuation commands to a corresponding robot of the plurality of robots.

2. The method of claim 1, comprising:
   loading, by the set of first processes, individual state data of the plurality of state data into a corresponding buffer of the plurality of first buffers;
   obtaining, by the second process, the plurality of state data from the plurality of first buffers; and
   loading, by the second process, the joint state vector into a second buffer.

3. The method of claim 2, wherein each of the plurality of first buffers is a circular buffer.

4. The method of claim 1, comprising:
   loading, by the third process during the active state, the joint action vector into a third buffer;
   obtaining, by the second process, the joint action vector from the third buffer;
   loading, by the second process, the plurality of actuation commands into corresponding buffers of a plurality of fourth buffers; and
   obtaining, by the set of first processes, the actuation commands from the plurality of fourth buffers.

5. The method of claim 4, wherein each of the plurality of fourth buffers is a circular buffer.

6. The method of claim 1, wherein the joint state vector is generated based on a defined objective of the second process, the defined objective to be achieved in a physical environment of the external real-time system.

7. The method of claim 1, comprising:
   generating, by the second process, information having a value representative of a state of a physical environment of the external real-time system relative to a defined objective, wherein the information is included in the joint state vector.

8. The method of claim 1, wherein the defined policy maps a state of the external real-time system to a corresponding action to be performed by a robot of the plurality of robots.

9. The method of claim 1, wherein the third process operates in the suspended state for a defined period of time prior to transitioning to the active state, and the third process transitions from the active state to the suspended state as a result of generating the joint action vector.

10. The method of claim 1, comprising:
    updating, by the third process, the defined policy based on the joint state vector.

11. The method of claim 10, wherein the defined policy is updated during a defined period of time in which the third process is in the suspended state.

12. The method of claim 1, wherein the set of first processes, the second process, and the third process are executing on a distributed computing system remotely located from the external real-time system.

13. The method of claim 1, wherein the set of first processes is executing on one or more first processors of the computer system, the second process is executing on a second processor of the computer system, and the third process is executing on a third processor of the computer system.

14. A system, comprising:
one or more communication interfaces configured to communicate over one or more networks;
one or more processors coupled to the one or more communication interfaces;
memory storing a set of instructions that cause the one or more processors to establish, via the one or more communication interfaces, communications with an external real-time system comprising a plurality of robots and that cause the one or more processors to execute processes that include:
a first communicator configured to receive first state data that indicates a state of a first robot of the plurality of robots, and cause the first robot to be controlled to take an action by transmitting a first actuation command to the first robot via the one or more communication interfaces;
a second communicator configured to receive second state data that indicates a state of a second robot of the plurality of robots, and to cause the second robot to be controlled to take an action by transmitting a second actuation command to the second robot via the one or more communication interfaces;
a task manager configured to:
generate a joint state vector based on the first state data and the second state data; and
parse a joint action vector into the first actuation command and the second actuation command; and
a reinforcement learning agent configured to:
transition from a suspended state, in which the reinforcement learning agent operates for a predefined period of time and does not obtain or process another joint state vector, to an active state;
generate, in the active state, the joint action vector based on the joint state vector; and
transition, in response to generating the joint action vector, back to the suspended state.

15. The system of claim 14, wherein, as a result of execution of the set of instructions by the one or more processors,
the first communicator is configured to store the first state data in a first buffer;
the second communicator is configured to store the second state data in a second buffer;
the task manager is configured to obtain the first state data from the first buffer and the second state data from the second buffer; and
the task manager is configured to store the joint state vector into a third buffer.

16. The system of claim 14, wherein, as a result of execution of the set of instructions by the one or more processors,
the reinforcement learning agent is configured to, in the active state, obtain the joint state vector from a first buffer and store the joint action vector into a second buffer;
the task manager is configured to obtain the joint action vector from the second buffer and store the first actuation command into a third buffer and store the second actuation command into a fourth buffer;
the first communicator is configured to read the first actuation command from the third buffer; and
the second communicator is configured to read the second actuation command from the fourth buffer.

17. The system of claim 14, wherein, as a result of execution of the set of instructions by the one or more processors, the task manager is configured to generate the joint state vector based on a defined objective that is to be achieved in a physical environment of the external real-time system.

18. The system of claim 14, wherein, as a result of execution of the set of instructions by the one or more processors, the task manager is configured to generate a value, to be included in the joint state vector, representative of a change in state of a physical environment of the external real-time system relative to a defined objective, the change in state as a result of a previous joint action vector generated by the reinforcement learning agent.

19. The system of claim 14, wherein, as a result of execution of the set of instructions by the one or more processors, the reinforcement learning agent is configured to operate in the suspended state for a defined period of time prior to transitioning to the active state, and configured to transition from the active state to the suspended state as a result of generating the joint action vector.

20. The system of claim 14, wherein the one or more processors are of a distributed computer system remotely located from the external real-time system.

21. The system of claim 14, wherein the task manager is a first process that executes on a first processor of the one or more processors, and the reinforcement learning agent is a second process the executes on a second processor of the one or more processors.

22. At least one non-transitory computer-readable media storing a set of instructions that, as a result of execution by one or more processors of a computer system, cause the one or more processors to implement a plurality of processes that include:
a first communicator process that receives first state data that indicates a state of a first robot operating in a physical environment, and causes the first robot to be controlled to take an action by transmitting a first actuation command to the first robot;
a second communicator process that receives second state data that indicates a state of a second robot operating in the physical environment, and causes the second robot to be controlled to take an action by transmitting a second actuation command to the second robot;
a task manager process that:
generates a joint state vector based on the first state data and the second state data; and
parses a joint action vector into the first actuation command and the second actuation command; and
a reinforcement learning agent process that:
transitions from a suspended state, in which the reinforcement learning agent operates for a predefined period of time and does not obtain or process another joint state vector, to an active state;
generates, in the active state, the joint action vector based on the joint state vector; and
transition, in response to generating the joint action vector, back to the suspended state.

23. The at least one non-transitory computer-readable media of claim 22, wherein the reinforcement learning agent process implemented by the one or more processors as a result of executing the set of instructions further:
operates in the suspended state for a defined period of time prior to transitioning to the active state, and transitions from the active state to the suspended state as a result of generating the joint action vector.

24. The at least one non-transitory computer-readable media of claim 22, wherein the set of instructions, as a result of execution by the one or more processors, cause the one or more processors to:
  execute the first communicator process on a set of first processors;
  execute the second communicator process on the set of first processors;
  execute the task manager process on a second processor; and
  execute the reinforcement learning agent process on a third processor.

25. The at least one non-transitory computer-readable media of claim 22, wherein the at least one non-transitory computer-readable media is of a distributed computing system remotely located from the physical environment.

* * * * *

UNITED STATES PATENT AND TRADEMARK OFFICE
CERTIFICATE OF CORRECTION

PATENT NO. : 12,005,578 B2  
APPLICATION NO. : 16/560761  
DATED : June 11, 2024  
INVENTOR(S) : Ashique Rupam Mahmood et al.

Page 1 of 1

It is certified that error appears in the above-identified patent and that said Letters Patent is hereby corrected as shown below:

On the Title Page

Item (73)/Assignee:
"Ocado Innovations Limited, Hatfield, (GB)"
Should read:
—Ocado Innovation Limited, Hatfield, (GB)—

Signed and Sealed this
Seventeenth Day of September, 2024

Katherine Kelly Vidal
*Director of the United States Patent and Trademark Office*